(12) United States Patent
Shirakawa et al.

(10) Patent No.: US 8,417,790 B2
(45) Date of Patent: Apr. 9, 2013

(54) COMMUNICATION SYSTEM, DATA TERMINAL APPARATUS, SERVER APPARATUS, AND MENU SCREEN UPDATING METHOD

(75) Inventors: Junichi Shirakawa, Nara (JP); Shinichi Kitabayashi, Kashihara (JP); Akira Tojima, Yamatokoriyama (JP)

(73) Assignee: Sharp Kabushiki Kaisha, Osaka (JP)

( * ) Notice: Subject to any disclaimer, the term of this patent is extended or adjusted under 35 U.S.C. 154(b) by 1077 days.

(21) Appl. No.: 11/476,601

(22) Filed: Jun. 29, 2006

(65) Prior Publication Data

US 2007/0016877 A1 Jan. 18, 2007

(30) Foreign Application Priority Data

Jun. 29, 2005 (JP) ............... P2005-190228
Jun. 14, 2006 (JP) ............... P2006-165394

(51) Int. Cl.
*G06F 15/16* (2006.01)
*G06F 3/00* (2006.01)
*G06F 13/00* (2006.01)

(52) U.S. Cl.
USPC ........... 709/217; 709/219; 715/700; 715/716; 725/39; 725/44; 725/46; 725/56; 725/61

(58) Field of Classification Search .................. 709/217, 709/219; 725/39, 44–47, 52, 61, 133, 141, 725/152; 715/700, 716, 738
See application file for complete search history.

(56) References Cited

U.S. PATENT DOCUMENTS 6,020,912 A * 2/2000 De Lang .................. 725/91
6,052,554 A * 4/2000 Hendricks et al. ............. 725/109
6,072,492 A * 6/2000 Schagen et al. ................ 715/733
6,804,537 B1 * 10/2004 Fujii .............................. 455/557
2002/0042925 A1 4/2002 Ebisu et al.
2002/0116633 A1* 8/2002 Kobayashi et al. ........... 713/200
2002/0144273 A1* 10/2002 Reto ................................ 725/86
2002/0197983 A1 12/2002 Chubb et al.
2003/0151621 A1* 8/2003 McEvilly et al. .............. 345/744
2003/0174177 A1 9/2003 Tsukuda et al.
2004/0117831 A1* 6/2004 Ellis et al. ......................... 725/53
2004/0148626 A1* 7/2004 Sakao et al. ..................... 725/37
2005/0039141 A1* 2/2005 Burke et al. ................... 715/810
2005/0202805 A1 9/2005 Chubb et al.
2006/0080380 A1* 4/2006 Aizu et al. ..................... 709/203

FOREIGN PATENT DOCUMENTS

EP     1 152 318 A2    11/2001
JP     9-305305        11/1997

(Continued)

*Primary Examiner* — Yasin Barqadle
*Assistant Examiner* — Joe Chacko
(74) *Attorney, Agent, or Firm* — Birch, Stewart, Kolasch & Birch, LLP

(57) ABSTRACT

There is provided a communication system, a data terminal apparatus, a server apparatus, and a menu screen updating method that succeed in enhancing the ease-of-use of a menu screen with additional functions. The service server transmits to the receiving apparatus additional menu data for permitting selection of additional functions. In the receiving apparatus, on the basis of initial menu data for permitting selection of initial functions and the additional menu data obtained as the second menu data, menu display data is produced. On the basis of the menu display data, a menu screen is created. The menu screen is outputted to the display device so that it shows up on the display section of the display device.

7 Claims, 27 Drawing Sheets

FOREIGN PATENT DOCUMENTS

| | | |
|---|---|---|
| JP | 11-110106 | 4/1999 |
| JP | 2001-86421 A | 3/2001 |
| JP | 2002-44536 | 2/2002 |
| JP | 2003-5883 A | 1/2003 |
| JP | 2003-6097 A | 1/2003 |
| JP | 2003-521055 A | 7/2003 |
| JP | 2003-524239 A | 8/2003 |
| JP | 3594187 B2 | 9/2004 |
| JP | 3646229 B2 | 2/2005 |
| WO | WO-01/56252 A2 | 8/2001 |
| WO | WO-01/56291 A2 | 8/2001 |
| WO | WO 2004/002156 A1 | 12/2003 |

\* cited by examiner

FIG. 19

| ID (66) | LABEL (67) | ch (68) | ICON URL (69) | TROUBLE ICON URL (71) | JUMP DESTINATION URL (70) |
|---|---|---|---|---|---|
| 11111 | SHOPPING | 1 | http://www.xxx.yyy/sp.jpg | http://www.xxx.yyy/sp_e.jpg | http://www.xxx.yyy/sp.html |
| 11120 | WEATHER FORECAST | 2 | http://www.xxx.yyy/wi.jpg | http://www.xxx.yyy/wi_e.jpg | http://www.aaa.bbb/wi.html |

FIG. 20

```
┌─────────────────────────────────────┐
│  ┌───────────────────────────────┐  │
│  :      USER REGISTRATION       :  │
│  └───────────────────────────────┘  │
│                                     │
│        AGE    :  [20-TO-29 ▲▼]      │
│        SEX    :  [  MALE   ▲▼]      │
│     DISTRICT  :  [  OSAKA  ▲▼]      │
│                                     │
│           [PRESS ENTER KEY]         │
└─────────────────────────────────────┘
```

FIG. 21                               ⟋72

| 73 | 74 | 75 | 76 | 77 |
|---|---|---|---|---|
| USER ID | SERVICE | ID | TIME | ACTION |
| 100045 | SERVICE 1 | 11112 | 05/05/31 17:10 | VIEW |
| 100045 | SERVICE 1 | 11124 | 05/05/31 17:40 | OPEN |
| 100045 | SERVICE 1 | 11124 | 05/05/31 18:40 | CLOSE |

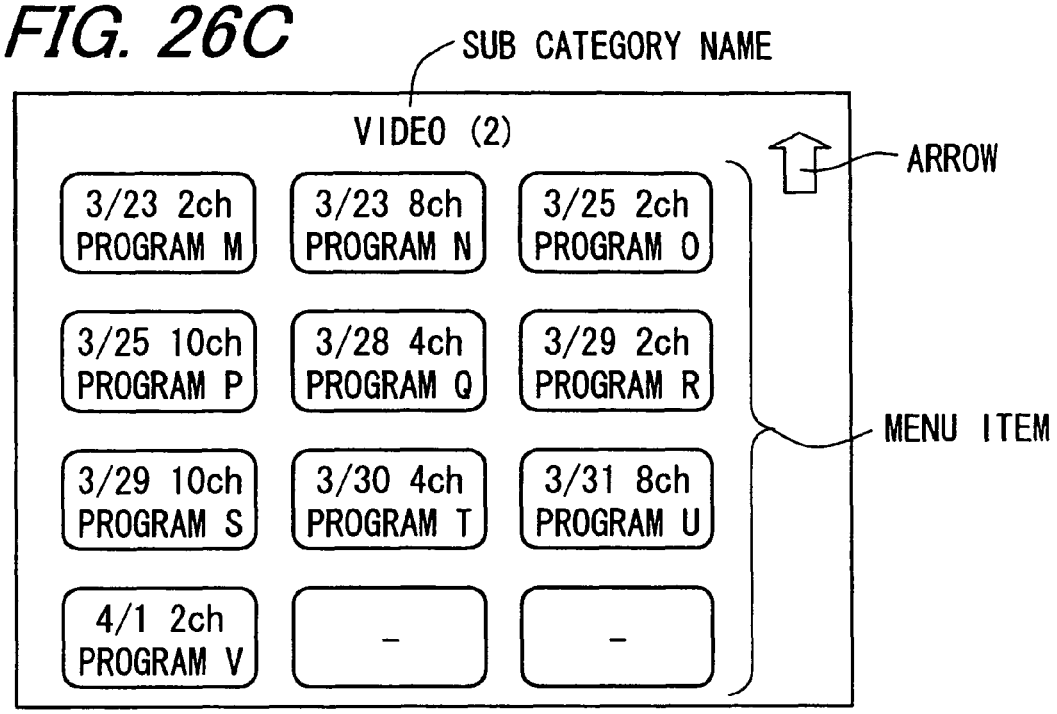

COMMUNICATION SYSTEM, DATA TERMINAL APPARATUS, SERVER APPARATUS, AND MENU SCREEN UPDATING METHOD

BACKGROUND OF THE INVENTION

1. Field of the Invention

The present invention relates to a data terminal apparatus capable of executing a plurality of functions in a selective manner by using a menu screen, a server apparatus constituted so as to effect data communication with the data terminal apparatus, a communication system composed of the data terminal apparatus and the server apparatus, and a method for updating a menu screen.

2. Description of the Related Art

In keeping with the recent buildup of communication network environments such as the Internet, it is becoming easier to achieve data communication on a household basis. While personal computers (PC) have been widely used as terminal apparatuses for data communication, some household electrical appliances such as a television receiving set, a game machine, and a set-top box have come to provide a data communication function and a browsing function so as to serve also as data communication terminal apparatuses.

For example, in order to browse an Internet web site on a PC, a browsing program, namely a browser is launched to make URL (Uniform Resource Locator) entry possible. In this case, a user is required to carry out troublesome operations to display the desired Internet web site on the screen.

In that connection, according to the data display/selection method disclosed in Japanese Unexamined Patent Publication JP-A 2003-6097, a list of higher-priority web sites to be linked is downloaded, and the link information provided in the list is correlated with a numeric keypad. In this way, a user is able to display a desired Internet web site on a screen simply by operating the ten-keypad. Moreover, according to the user terminal disclosed in Japanese Laid-open Patent Publication JP-A 2003-524239, a channel table for providing a summary of the names and addresses of Internet web sites is downloaded, and the channel numbers and the names of Internet web sites are displayed in a menu form. In this way, a user is able to display a desired Internet web site on a screen simply by entering a given channel number with use of the ten-key pad.

On the other hand, in order to browse an Internet web site on a television receiving set, an internet connection mode is established to make URL entry possible. Also in this case, a user is required to carry out troublesome operations to display the desired Internet web site on the screen. In order to overcome such a problem and ensure higher operability, the following techniques have been developed to date.

In the Internet television receiving set disclosed in Japanese Unexamined Patent Publication JP-A 2001-86421, Internet address information is received at regular time intervals, and a predetermined channel number is assigned to each of the received Internet addresses. In this way, a user is able to display a desired Internet web site on the screen simply by selecting a corresponding channel number. Moreover, in the television receiving set disclosed in Japanese Unexamined Patent Publication JP-A 2002-44536, channel selection numbers and operation program (browser, for instance)-related information or program selection information are stored correlatively to each other. In this way, a user is able to display a desired Internet web site on the screen simply by selecting a corresponding channel selection number.

Further, the data processing apparatus disclosed in Japanese Patent Publication No. 3594187 is designed to deal with both content data being developed over a network and television broadcast waves. In this construction, with the acquisition of information on a control button for allowing access to content data, a control button to be operated for viewing a predetermined program aired on television and the control button for allowing access to content data are displayed on the same screen. As the last reference, in the communication terminal support network system disclosed in Japanese Patent Publication No. 3646229, the terminal support apparatus incorporated therein is provided with means for producing a menu screen indicative of a procedure to be followed in establishing connection between a subscriber's terminal and an external communication terminal, and means for storing control server-rewritable menu screen data. In this construction, the menu screen data is rewritten by the control server on the basis of an update number received upon communication with the terminal support apparatus. This makes it possible to simplify user operation.

However, the above stated inventions have the following disadvantages. According to the disclosures of JP-A 2001-86421 and JP-A 2002-44536, by bringing an Internet address or a data processing program such as a browser or a mailer into correspondence with a given channel number, it is possible to allow a user to effect data communication through a simple operation similar to that for viewing television programs. In this case, however, it is necessary for the user to carry out a setting operation to define the correspondence. Therefore, a setting operation needs to be performed every time a change or addition is made to the correspondence. According to the disclosure of Japanese Patent Publication No. 3594187, since the first control button for allowing access to content data and the second control button for viewing television programs are displayed on the same screen, it follows that a user may possibly get confused about a plurality of functions, which leads to poor operability. The addition of functions cannot be achieved without increasing the number of the first button. The information for the display of the first control button is available through a network, wherefore the number of the first control button is undesirably increased against user's will. As a result, the operability will be decreased even further.

According to the disclosure of Japanese Patent Publication No. 3646229, menu screen data is rewritten by reprogramming the menu data storage means of the terminal support apparatus in the maintenance means of the control server. In this case, the control server is inevitably put under a heavy load, and is thus required to have higher data processing capability.

SUMMARY OF THE INVENTION

An object of the invention is to provide a communication system, a data terminal apparatus, a server apparatus, and a menu screen updating method that succeed in enhancing the ease-of-use of a menu screen with additional functions.

Another object of the invention is to provide a communication system, a data terminal apparatus, a server apparatus, and a menu screen updating method that succeed in reducing data processing burdens imposed upon the server apparatus.

The invention provides a communication system comprising:

a data terminal apparatus capable of executing a plurality of functions in a selective manner by using a menu screen; and a server apparatus constituted so as to effect data communication with the data terminal apparatus, wherein the data terminal apparatus comprises:

terminal-side storage means for storing therein first menu data indicative of a layout of the menu screen;

data producing means for obtaining third menu data on the basis of the first menu data and second menu data which is different from the first menu data;

screen producing means for creating a menu screen on the basis of any of the first to third menu data;

output means for outputting the menu screen thus created; and terminal-side communicative means for effecting data communication with the server apparatus, wherein the server apparatus comprises:

server-side storage means for storing therein the second menu data; and server-side communicative means for effecting data communication with the data terminal apparatus, and wherein when the server-side communicative means transmits the second menu data to the data terminal apparatus and the terminal-side communicative means of the data terminal apparatus receives the second menu data sent from the server apparatus, the data producing means obtains, on the basis of the first menu data and the second menu data, third menu data having the same data architecture as the first menu data and the screen producing means creates a menu screen on the basis of the third menu data thus obtained.

According to the invention, the communication system is constituted by a data terminal apparatus capable of executing a plurality of functions in a selective manner by using a menu screen and a server apparatus constituted so as to effect data communication with the data terminal apparatus.

In the data terminal apparatus, terminal-side storage means stores therein the first menu data indicative of the layout of the menu screen; data producing means produces the third menu data on the basis of the first menu data and the second menu data which is different from the first menu data; screen producing means creates a menu screen on the basis of any of the first to third menu data; and output means outputs the menu screen thus created.

In the server apparatus, the second menu data is stored in server-side storage means, and the server-side communicative means transmits the second menu data to the data terminal apparatus. At the instant when the terminal-side communicative means of the data terminal apparatus receives the second menu data sent from the server apparatus, the data producing means produces, on the basis of the first menu data and the second menu data, the third menu data having the same data architecture as the first menu data. On the basis of the third menu data thus obtained, a menu screen is created by the screen producing means. The menu screen is then outputted by the output means.

Even if the data terminal apparatus is provided with an additional function, by virtue of the reception of the second menu data, it is possible to create a menu screen based on the third menu data having the same data architecture as the first menu data, and thereby increase the user friendliness in menu screen operation.

In the invention, it is preferable that each of the menu data is arranged in a hierarchical format, and that the screen producing means creates a hierarchical set of menu screens.

According to the invention, each of the menu data is arranged in a hierarchical format, and the screen producing means creates a hierarchical set of menu screens.

Thus, for example, additional functions can be assigned to the menu screens of different hierarchical levels, wherefore the ease-of-use of the menu screen can be improved even further.

In the invention, it is preferable that the first menu data refers to unrewritable initial menu data, and that, every time the second menu data is received, the data producing means produces the third menu data by adding the received second menu data to the first menu data.

According to the invention, every time the second menu data is received, the data producing means produces the third menu data by adding the received second menu data to the first menu data, namely the unrewritable initial menu data.

It is thus ensured that new second menu data is regularly added to the initial menu data. Therefore, even if the menu screen undergoes updating several times, it is possible to keep the menu screen up to date regardless of a history of updating.

In the invention, it is preferable that the communication system further comprises a selection device for permitting selection of a function to be executed, the selection device comprising:

a plurality of keys;

detecting means for detecting which key is selected from among the plurality of keys; and transmitting means for transmitting a detection result to the data terminal apparatus, wherein the data terminal apparatus includes receiving means for receiving the detection result sent from the selection device, and wherein the screen producing means creates a menu screen in accordance with a key arrangement of the selection device.

According to the invention, the communication system further comprises a selection device for permitting selection of a function to be executed.

In the selection device having a plurality of keys, detecting means, and transmitting means, at the instant when the detecting means detects which key is selected from among a plurality of keys, the transmitting means transmits the detection result to the data terminal apparatus.

The data terminal apparatus includes receiving means for receiving the detection result sent from the selection device. The screen producing means creates a menu screen in accordance with the key arrangement of the selection device.

It is thus possible to create and display a menu screen based on the key arrangement of the selection device such as a remote controller. Accordingly, the ease-of-use of the menu screen can be improved even further.

In the invention, it is preferable that the communication system further comprises a mobile terminal apparatus for permitting selection of a function to be executed, the mobile terminal apparatus comprising:

a plurality of keys;

detecting means for detecting which key is selected from among the plurality of keys; and displaying and detecting means for displaying a plurality of soft keys and detecting which soft key is selected from among the plurality of soft keys;

transmitting and receiving means for transmitting a detection result to the data terminal apparatus and receiving any of the first to third menu data sent from the data terminal apparatus; and terminal-side screen producing means for creating a menu screen on the basis of any of the received first to third menu data, wherein the displaying and detecting means displays a soft key by which a function can be selected on the menu screen created by the terminal-side screen producing means, and upon the selection of the soft key, transmits data about a type of the function corresponding to the selected soft key to the data terminal apparatus via the transmitting and receiving means.

According to the invention, the communication system further comprises a mobile terminal apparatus for permitting selection of a function to be executed.

In the mobile terminal apparatus, the transmitting and receiving means receives any of the first to third menu data sent from the data terminal apparatus, and terminal-side screen producing means then creates a menu screen on the basis of any of the received first to third menu data.

The displaying and detecting means displays a soft key by which a function can be selected on the menu screen created by the terminal-side screen producing means, and upon the selection of the soft key, transmits data about a type of the function corresponding to the selected soft key to the data terminal apparatus via the transmitting and receiving means.

A user can thus select a function to be executed by operating a soft key displayed on the displaying and detecting means of the mobile terminal apparatus.

The invention provides a data terminal apparatus constituting the communication system as set forth hereinabove, comprising:

requesting means for issuing a request for transmission of the second menu data to the server apparatus.

According to the invention, the data terminal apparatus constituting the communication system includes requesting means for issuing a request for transmission of the second menu data to the server apparatus.

Since the server apparatus transmits the second menu data to the data terminal apparatus on a per-request basis, it follows that the data transmitting operation is sporadically timed. This helps lighten the load imposed on the server apparatus.

The invention provides a server apparatus constituting the communication system as set forth hereinabove, comprising:

determining means for determining which second menu data is transmitted to the data terminal apparatus on the basis of historic data indicative of a history of function execution effected by the data terminal apparatus.

According to the invention, the server apparatus constituting the communication system includes determining means for determining which second menu data is transmitted to the data terminal apparatus on the basis of historic data indicative of a history of function execution effected by the data terminal apparatus.

It is thus possible to create and display a menu screen in which the historic data is reflected. This helps increase the user friendliness.

The invention provides a mobile terminal apparatus constituting the communication system as set forth hereinabove, comprising:

menu data requesting means for issuing a request for transmission of any of the first to third menu data to the data terminal apparatus.

According to the invention, the mobile terminal apparatus constituting the communication system includes menu data requesting means for issuing a request for transmission of any of the first to third menu data to the data terminal apparatus.

It is possible to obtain the menu data when needed, and display the menu screen on the mobile terminal apparatus to select a function.

The invention provides a menu screen updating method of updating a menu screen on the basis of information sent from a server apparatus in a communication system composed of a data terminal apparatus capable of executing a plurality of functions in a selective manner by using a menu screen and the server apparatus constituted so as to effect data communication with the data terminal apparatus, the method comprising the steps of:

transmitting by the server apparatus to the data terminal apparatus, second menu data which is different from first menu data indicative of a layout of the menu screen that is stored in the data terminal apparatus;

upon receipt of the second menu data sent from the server apparatus by the data terminal apparatus, producing on the basis of the first menu data and the second menu data, third menu data having the same data architecture as the first menu data; and outputting a menu screen on the basis of the third menu data thus obtained.

According to the invention, in accordance with the menu screen updating method, in the data terminal apparatus is updated a menu screen for permitting selection of a function to be executed on the basis of information sent from the server apparatus.

More specifically, as the first step, the server apparatus transmits to the data terminal apparatus the second menu data which is different from the first menu data indicative of the layout of the menu screen. The first menu data is stored in the data terminal apparatus. As the second step, upon receipt of the second menu data sent from the server apparatus by the data terminal apparatus, on the basis of the first menu data and the second menu data, the third menu data having the same data architecture as the first menu data as well as the second menu data is produced. As the last step, a new menu screen is outputted on the basis of the third menu data thus obtained.

Even if the data terminal apparatus is provided with an additional function, by virtue of the reception of the second menu data, it is possible to create a menu screen based on the third menu data having the same data architecture as the first menu data, and thereby increase the user friendliness in menu screen operation.

BRIEF DESCRIPTION OF THE DRAWINGS

Other and further objects, features, and advantages of the invention will be more explicit from the following detailed description taken with reference to the drawings wherein:

FIG. 19 is a view showing a data architecture of menu item data;

FIG. 20 is a view showing a user registration screen;

FIG. 21 is a view showing a data architecture of operation history data;

FIGS. 26A through 26C are views showing an alternate example of the menu screens to be displayed on the display section of the display device.

DETAILED DESCRIPTION

Figure 1:
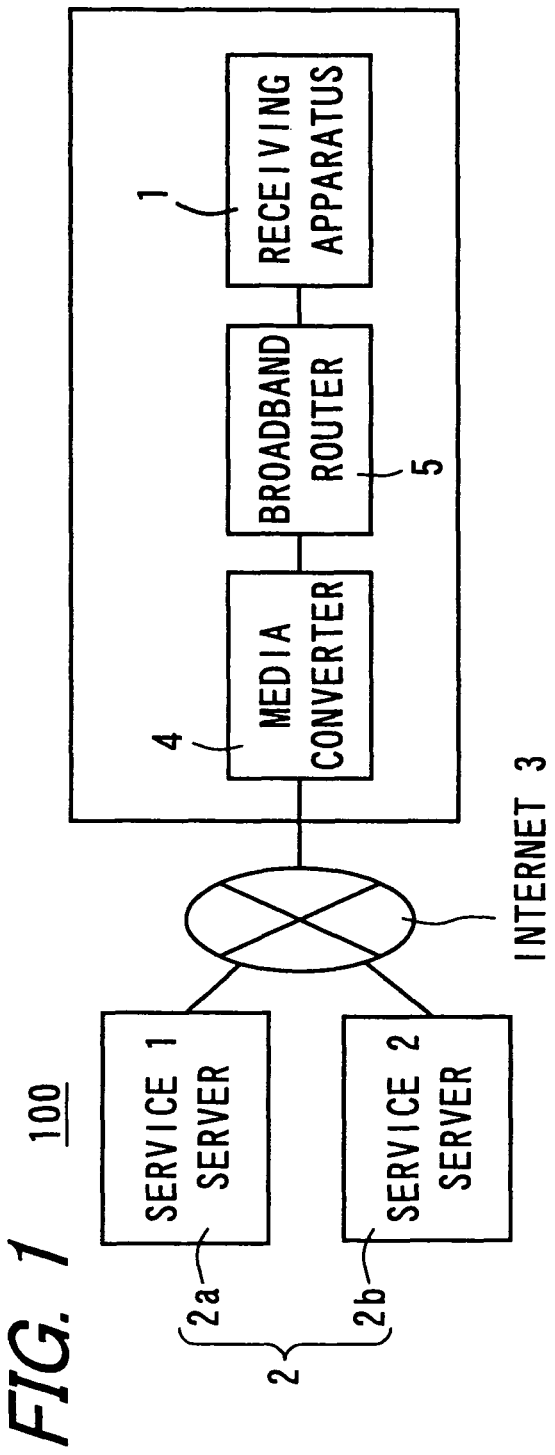
FIG. 1 is a schematic view showing a communication system according to one embodiment of the invention.

Now referring to the drawings, preferred embodiments of the invention are described below.

FIG. 1 is a schematic view showing a communication system 100 according to one embodiment of the invention. The communication system 100 is composed of a receiving apparatus 1 and a service server 2.

The receiving apparatus 1 and the service server 2 are connected to each other via a communication network such as the Internet 3 so as to effect data communication. In a case where a fiber-optic cable is run in a house as a drop wire for establishing connection with the Internet 3, the communication system 100 is further provided with a media converter 4 for converting an optical signal into an electrical signal. Moreover, in a case where a plurality of communication apparatuses are connected together with such a function as NAT (Network Address Translation), the communication system 100 is further provided with a broadband router 5 for enabling a plurality of communication apparatuses to access a communication network simultaneously. Note that the broadband router 5 functions as a wireless access point in a wireless communication performed in accordance with a standard such as IEEE (Institute of Electrical and Electronic Engineers) 802.11g. Accordingly, the interposition of the broadband router 5 allows connection through wireless communication in a house between an appliance and an apparatus which are capable of wireless communication, or between an appliance in a house and a given server on the internet 3 to effect data communication.

In the communication system 100, a user is able to enjoy communication service such as distribution of a variety of contents by operating the receiving apparatus 1.

Figure 2:
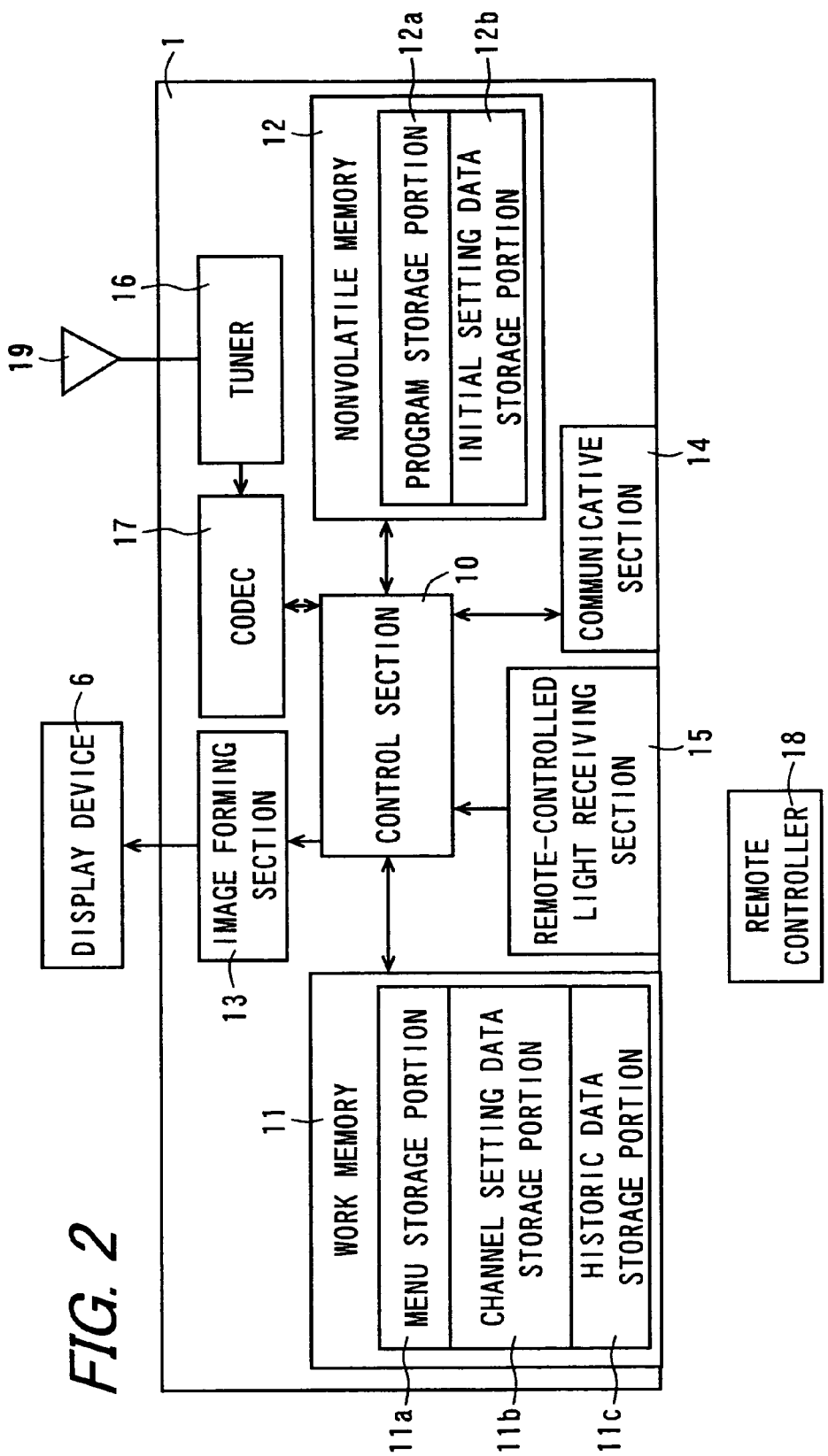
FIG. 2 is a block diagram showing a constitution of a receiving apparatus.

FIG. 2 is a block diagram showing the constitution of the receiving apparatus 1.

A moving image as well as a menu screen outputted from the receiving apparatus 1 is displayed on the display section of a display device 6. In the menu screen are shown receiving apparatus 1-executable functions (initial functions) and functions to be executed for utilization of communication service (additional functions). A user is able to choose a desired function while looking at the menu screen. In the receiving apparatus 1 is created a menu screen on the basis of menu data indicative of the layout of the menu screen. The menu screen thus created is outputted to the display device 6.

The service server 2 transmits, to the receiving apparatus 1, additional menu data for permitting selection of additional functions. In the receiving apparatus 1, on the basis of initial menu data (the first menu data) for permitting selection of the initial functions and the additional menu data (the second menu data), menu display data (the third menu data) is formulated. On the basis of the menu display data thus obtained, a menu screen is created.

The receiving apparatus 1 is implemented as a data terminal apparatus by the use of an information-processing apparatus such as a PC. The receiving apparatus 1 is composed of: a control section 10; a work memory 11; a nonvolatile memory 12; an image forming section 13; a communicative section 14; a remote-controlled light receiving section 15; a tuner 16; a codec 17; and a remote controller 18.

For example, the control section 10 is implemented by the use of a CPU (Central Processing Unit) having computation capability to exercise control over the entire apparatus as well as to execute programs, thereby constituting data producing means, screen producing means, and requesting means. The work memory 11, which is constituted by a volatile, high-speed readable and writable memory device such as a DRAM (Dynamic Random Access Memory), is used mainly for temporary data storage. The work memory 11 is composed at least of a menu storage portion 11a, a channel setting data storage portion 11b, and a historic data storage portion 11c. In the menu storage portion 11a is stored pertinent data sent from the service server 2, such as menu data and the date and time of data reception. In the channel setting data storage portion 11b is stored setting data indicative of the correspondence between the constituent elements of a menu screen and channel numbers. In the historic data storage portion 11c is stored historic data indicative of a user operation history. The nonvolatile memory 12, which is constituted by a memory device that is capable of storing information without the necessity of power supply, such as a hard disk drive or a flash memory, serves as terminal-side storage means for storing therein factory-default initial data and, of the data specified by a user during the operation of the apparatus, specific information that needs to be stored continuously. The nonvolatile memory 12 is necessary to make use of service and programs to be executed in accompaniment with the operation of the receiving apparatus 1. Included therein are a program storage portion 12a and an initial setting data storage portion 12b. In the program storage portion 12a is stored a WWW browser program for viewing HTML (HyperText Markup Language)-described Web pages stored in WWW (World Wide Web) servers. In the initial setting data storage portion 12b is stored, for example, information on service servers with which the receiving apparatus 1 exchanges data for communication service and the initial menu data for permitting selection of the receiving apparatus 1-executable functions.

The image forming section 13 serves as output means. That is, a moving image or a menu screen formed therein is outputted to the display device 6, whereupon it is displayable on the display section of the display device 6. The communicative section 14 is implemented, by the use of a data communication interface such as a LAN (Local Area Network) interface, as terminal-side communicative means for effecting interactive communication in response to communication program instructions. In the remote-controlled light-receiving section 15 constituted by a device such as that which receives infrared rays emitted from the remote control unit (remote controller) 18, key data gained through the operation of the remote controller 18 is transmitted to the control section 10. In the tuner 16, in response to television broadcast waves received by an antenna 19, broadcast signals of specific frequencies are obtained on a channel-by-channel basis. In the codec 17, in the presence of analog broadcasting recording capability, the broadcast signals fed from the tuner 16 are encoded for example in the MPEG 2 (Moving Picture Experts Group phase 2) fashion, and recorded moving image data is decoded. The remote controller 18 having a plurality of keys is used as a selection device. User-selected key data obtained through the operation of the remote controller 18 is transmitted to the remote-controlled light-receiving section 15 by means of wireless communication using infrared rays or the like.

For example, the display device 6 is implemented by the use of a liquid crystal display. A speaker is incorporated therein to produce sound output. As an external appliance, the display device 6 is connected via a cable to the receiving apparatus.

Figure 3:
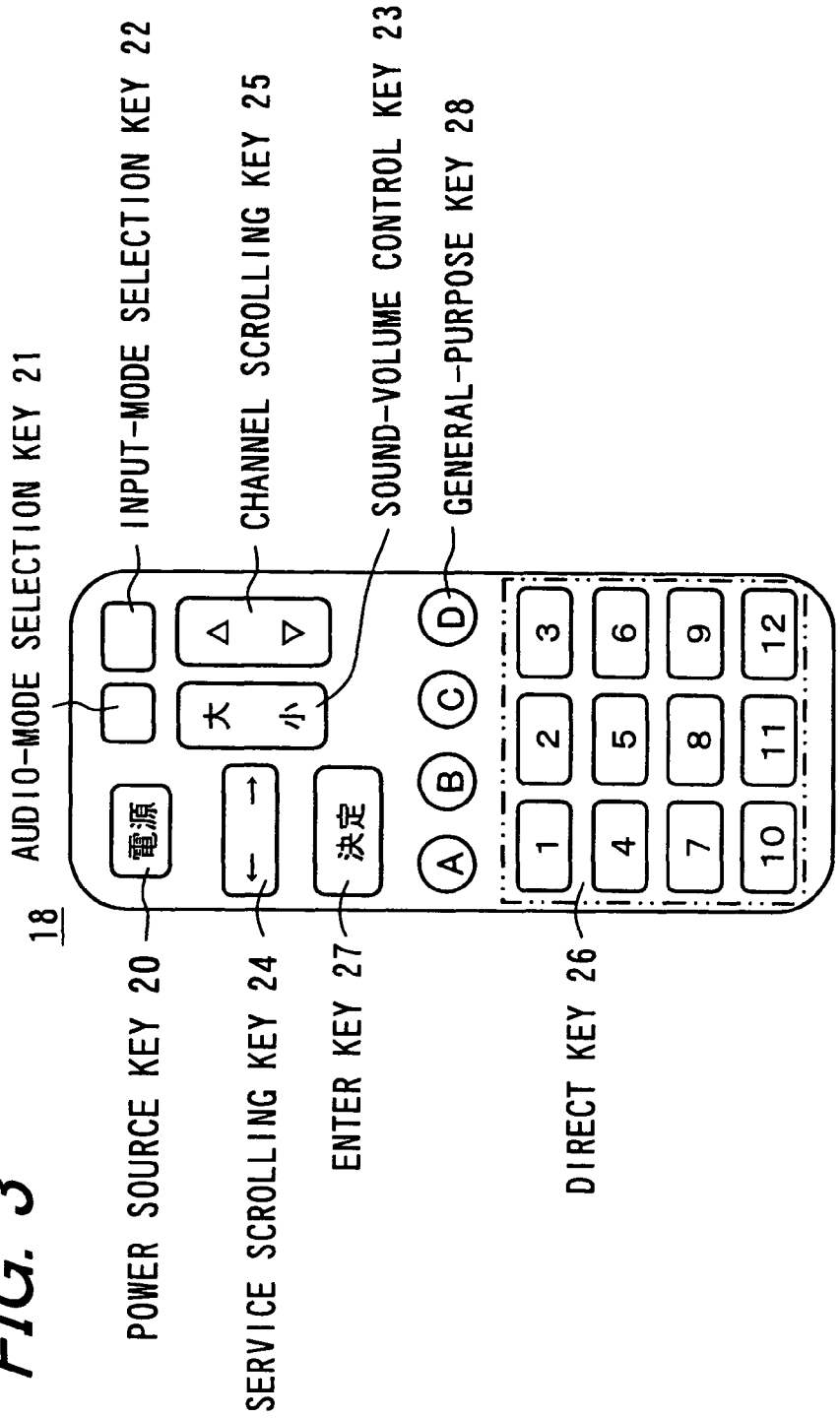
FIG. 3 is an external view of a remote controller.

FIG. 3 is an external view of the remote controller 18. The remote controller 18 is provided with user-operable function keys; that is, a power source key 20; an audio-mode selection key 21; an input-mode selection key 22; a sound-volume control key 23; a service scrolling key 24; a channel scrolling key 25; a direct key 26; an ENTER key 27; and a general-purpose key 28.

The power source key 20 switches the receiving apparatus 1 main body between an ON state and an OFF state. The audio-mode selection key 21 switches the mode of sound in broadcasting from stereo to monaural, or steps the mode of sound in multiple-channel broadcasting from main sound to sub sound, from sub sound to main sound+sub sound, and from main sound+sub sound to main sound in turn. The input-mode selection key 22 switches an image displayed on the screen of the display device 6 between a television broadcasting signal-based state and an externally inputted signal-based state. The sound-volume control key 23 consists of two key portions indicating "high volume" and "low volume", respectively, for allowing adjustment of the volume of sound coming from the speaker of the display device 6. The service scrolling key 24 consists of two key portions indicating "rightward-pointing symbol" and "leftward-pointing symbol", respectively, for allowing cursor movement in rightward and leftward directions, or forward and backward scrolling of data items externally obtained through communication service on a menu display screen laid out according to the key arrangement of the remote controller. The channel scrolling key 25 consists of two key portions indicating "upward-pointing symbol" and "downward-pointing symbol", respectively, for allowing cursor movement in upward and downward directions, or forward and backward scrolling of all the channels established on a menu display screen laid out according to the key arrangement of the remote controller, namely the channels originally established in the receiving apparatus 1 main body and the channels obtained through communication service. The direct key 26 includes 12 pieces of key portions assigned with numbers ranging from 1 to 12, respectively, for allowing direct selection of channels in accordance with the numbers. The ENTER key 27 is used to effect input confirmation, depression of a key displayed on the menu screen, and other relevant operations. The general-purpose key 28 consists of four key portions indicating "A", "B", "C", and "D", respectively, for providing operation assistant keys.

Figure 4:
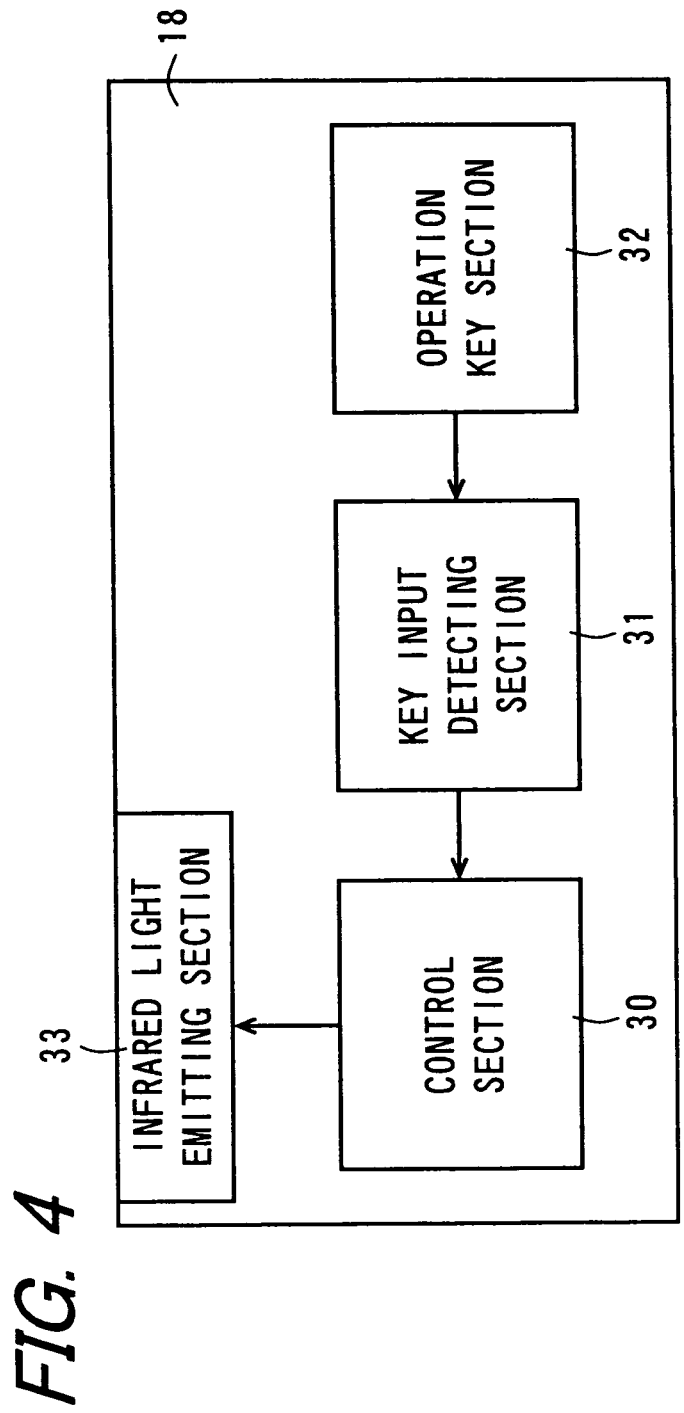
FIG. 4 is a block diagram showing a constitution of the remote controller.

FIG. 4 is a block diagram showing the constitution of the remote controller 18. The remote controller 18 is composed of a control section 30, a key input detecting section 31, an operation key section 32, and an infrared light emitting section 33. The operation key section 32 includes the keys illustrated in FIG. 3.

Upon the operation key section 32 being operated by a user, the key input detecting section 31 built as detecting means detects which key is selected, and the control section 30 outputs the detection result about the inputted key by way of the infrared light emitting section 33 acting as data transmitting means.

The service server 2 is implemented by the use of an information processing apparatus, which provides menu data to the receiving apparatus 1. The service server 2 may be designed to effect storage, transmission, and reception of data as additional functions to make communication service available. Note that a service 1 server 2a and a service 2 server 2b have basically the same configuration, but deal with communication service of different kinds.

Figure 5:
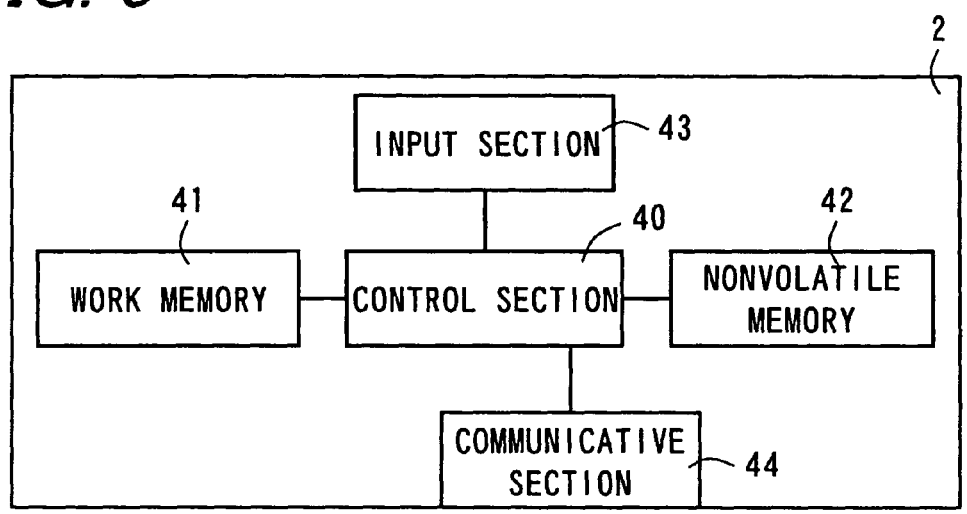
FIG. 5 is a block diagram showing a constitution of a service server.

FIG. 5 is a block diagram showing the constitution of the service server 2. The service server 2 has, like a WWW server for example, the function of sending information out upon request.

The service server 2 is built as a server apparatus composed of: a control section 40; a work memory 41; a nonvolatile memory 42; an input section 43; and a communicative section 44. For example, the control section 40 is implemented by the use of a CPU as determining means having computation capability to exercise control over the entire server as well as to execute programs. The work memory 41, which is constituted by a volatile, high-speed readable and writable memory device such as a DRAM, is used mainly for temporary data storage. The nonvolatile memory 42, which is constituted by a memory device which is capable of storing information without the necessity of power supply, such as a hard disk drive or a flash memory, serves as server-side storage means for storing therein additional menu data to be sent to the receiving apparatus 1 upon request. In the input section 43, for example, data input and command input are carried out through the operation of a keyboard or a mouse performed by a user. The communicative section 44 is implemented, by the use of a data communication interface such as a LAN interface, as server-side communicative means for effecting interactive communication in response to communication program instructions.

Hereinafter, a description will be given as to various data processing operations performed in the communication system 100.

Figure 6:
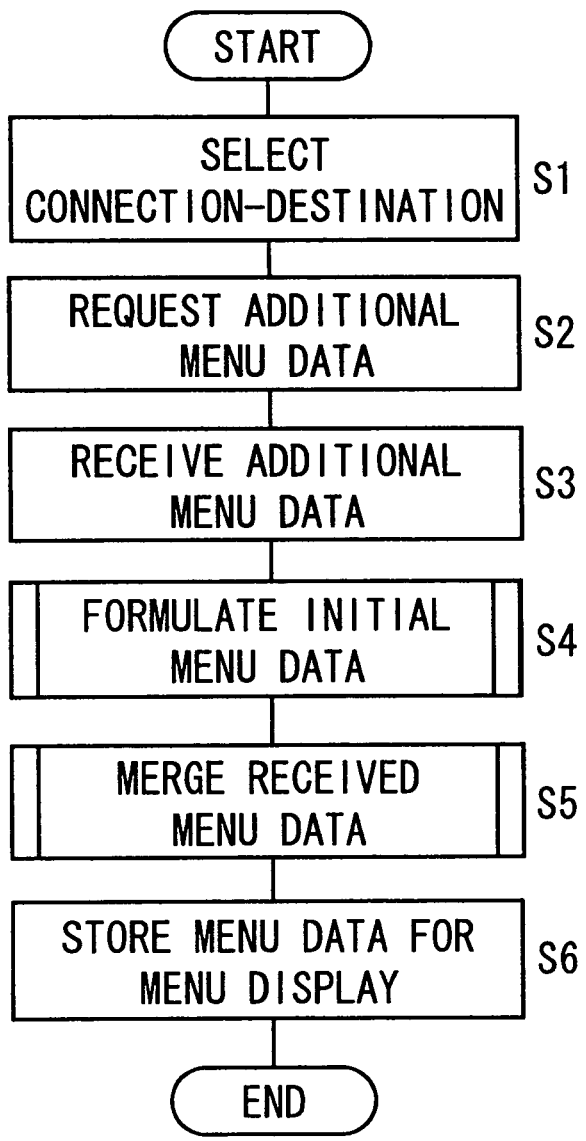
FIG. 6 is a flow chart showing a procedure to be followed by the receiving apparatus in carrying out menu updating.
Figure 7:
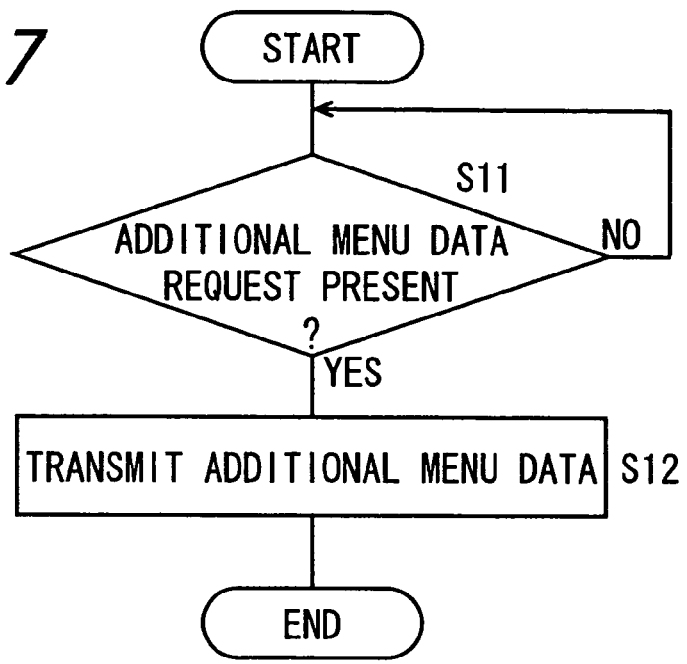
FIG. 7 is a flow chart showing a procedure to be followed by the service server in carrying out transmission of additional menu data.

FIG. 6 is a flow chart showing a procedure to be followed by the receiving apparatus 1 in carrying out menu updating. FIG. 7 is a flow chart showing a procedure to be followed by the service server 2 in carrying out transmission of additional menu data.

In the receiving apparatus 1, a menu updating process is executed by the updating process program stored in the program storage portion 12a of the nonvolatile memory 12. The menu updating process gets started upon turning the power on. In Step S1, it is permitted to select a service server to be connected.

Figure 8:
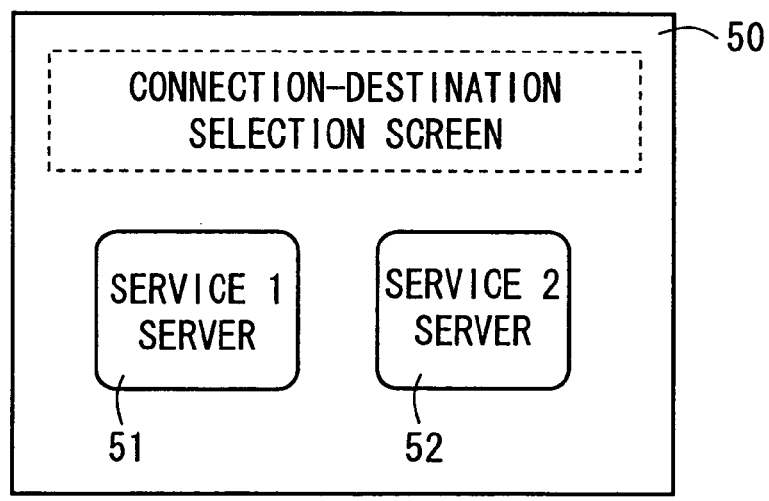
FIG. 8 is a view showing a connection-destination selection screen.
Figure 9:
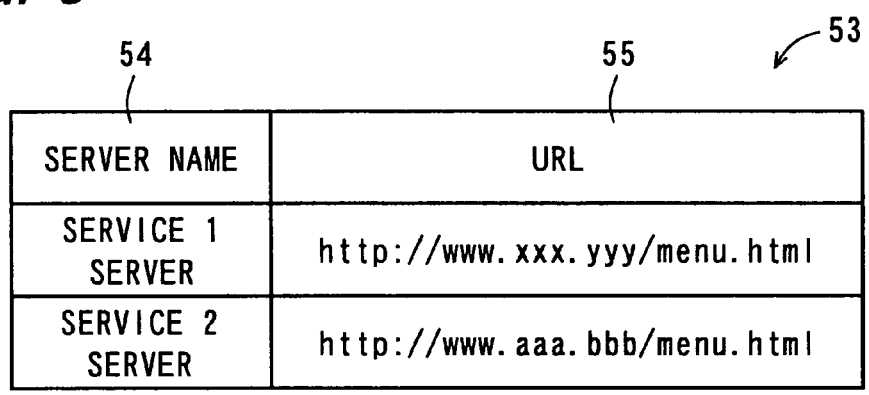
FIG. 9 is a view showing a data architecture of connection-destination data.

More specifically, a connection-destination selection screen 50 such as shown in FIG. 8 is displayed on the display section of the display device 6 to allow a user to choose a desired service server that provides additional menu data. For example, of a service 1 server icon 51 and a service 2 server icon 52, a desired one is highlighted by operating the service scrolling key 24 of the remote controller 18, followed by depressing the ENTER key 27. In this way, the user is able to choose a desired service server. The information about the to-be-connected service server 2 required for the display of the connection-destination selection screen 50 is stored in the initial setting data storage portion 12b as connection-destination data 53 having a data architecture such as shown in FIG. 9. The connection-destination data 53 is composed of a server name 54 and a URL 55. The server name 54 refers to a to-be-connected service server identifying designation, for example, the name of available service. The URL 55 refers to the address of a connectable service server. Note that the selection of the service server is effected upon turning the power on at the outset of operations, as well as at the user's request.

The selection of the connection-destination is not always necessary. In a case where the selecting operation is not conducted, a menu updating request may be issued to all of the servers which have previously registered in the initial setting data storage portion 12b of the receiving apparatus 1 in Step S6 which will be described hereinbelow.

Upon a connection-destination being specified by the user, in Step S2, an additional menu data transmission request is issued to the corresponding URL described in the connection-destination data 53.

At this time, in the service server 2, as shown in FIG. 7, in Step S11, whether or not an additional menu data transmission request is issued by the receiving apparatus 1 is monitored. In the presence of a request, the procedure proceeds to Step S12 where additional menu data is transmitted to the receiving apparatus 1 that made the request. Even after the transmission of additional menu data has been completed, such an additional menu data transmission process will be performed repeatedly in preparation to following additional menu data transmission requests.

Subsequently, in Step S3, the receiving apparatus 1 receives the additional menu data sent from the service server 2. The additional menu data is organized hierarchically and includes two kinds of information: category data and menu item data. The category data is composed of a plurality of data items organized according to category in a hierarchical data architecture. Each category includes menu items or subordinate menu options.

Figure 10:
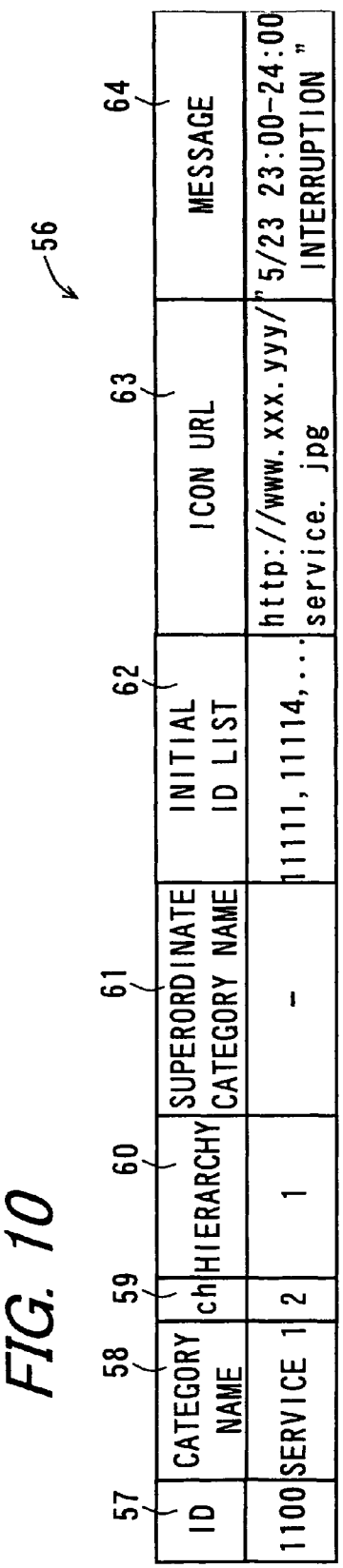
FIG. 10 is a view showing a data architecture of category data.

FIG. 10 is a view showing the data architecture of the category data 56. The category data 56 is composed of: an ID 57; a category name 58; a ch number 59; a hierarchy 60; a superordinate category name 61; an initial ID list 62; an icon URL 63; and a message 64. The ID 57 refers to a category identifying number. The category name 58 refers to the designation of the category. The ch number 59 refers to a channel number which is necessary for the category to be assigned a given key portion of the direct key 26 of the remote controller 18 when viewed on a menu screen. The hierarchy 60 refers to a hierarchical level at which the category stands. The larger the number, the lower the level of the category. The superordinate category name 61 refers to the designation of a superordinate category to which the category belongs. When the field for hierarchy 60 indicates 1, it means the top of the hierarchy, and therefore the field for superordinate category name 61 is left in blank. In the field for initial ID list 62 are enumerated IDs of menu items included in the category or IDs of sub categories. The icon URL 63 refers to an URL for obtaining icon data for the display of an icon on a menu screen. Note that, in a case where icon data is stored in the initial setting data storage portion 12b disposed within the receiving apparatus 1, instead of the URL, a path provided on the file system constructed in the nonvolatile memory 12 is described in this field. The message 64 refers to a character string indicative of a category explanation, a notice of the duration of interruption of network service, or other information. The message 64 shows up on the top screen related to the category in accompaniment with the display of a menu screen.

Figure 11:
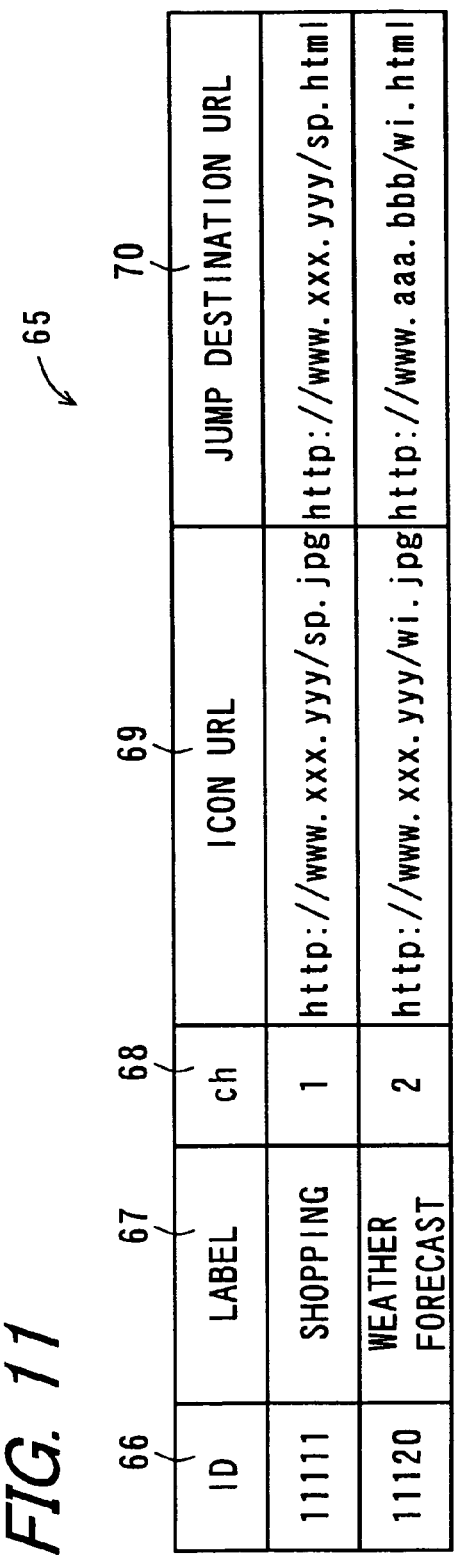
FIG. 11 is a view showing a data architecture of menu item data.

FIG. 11 is a view showing the data architecture of the menu item data 65. The menu item data 65 is composed of: an ID 66; a label 67; a ch number 68; an icon URL 69; and a jump destination URL 70. The ID 66 refers to a menu-item identifying number which is uniquely defined along with the category IDs. The label 67 refers to the designation of the menu item. The ch number 68 refers to a channel number which is necessary for the menu item to be assigned a given key portion of the direct key 26 of the remote controller 18 when viewed on a menu screen. The icon URL 69 refers to an URL for obtaining icon data for the display of an icon on a menu screen. The jump destination URL 70 refers to the URL of a web site which is displayed by launching a WWW browser program at the time of user's menu item selection. Note that, in a case of executing a program stored in the program storage portion 12a of the receiving apparatus 1 at the time of user's menu item selection, instead of the URL, a path provided on the file system constructed in the nonvolatile memory 12 is described in this field.

The additional menu data elements including the category data and the menu item data are all received by the receiving apparatus first, and then stored in the menu storage portion 11a of the work memory 11.

Subsequently, with reference to FIG. 6, in the receiving apparatus 1, as Step S4, a menu display format is produced on the basis of the initial menu data stored in the initial setting data storage portion 12b. In Step S5, the received additional menu data is merged to obtain menu display data. The initial menu data is of unrewritable data indicative of the receiving apparatus 1-executable original functions. The initial menu data is analogous in data architecture to the additional menu data sent from the service server 2; that is, it is composed of category data and menu item data.

In Step S6, the menu display data thus obtained is stored in the channel setting data storage portion 11b and a menu screen which is displayable on the display section of the display device 6 is created and outputted.

Although the above description deals with the case of making connection to a single service server, a plurality of service servers can be connected similarly. In this case, an additional menu data transmission request and data reception are repeated in accordance with the number of service servers to be connected.

The menu updating process is executed every time the power is turned on. Therefore, even if a data change occurs in the service server 2, it is possible for the change to take effect readily. Moreover, since the additional menu data is transmitted to the receiving apparatus 1 on a per-request basis, it follows that the action of the service server 2 is sporadically timed, wherefore the load imposed thereon can be lightened.

Figure 12:
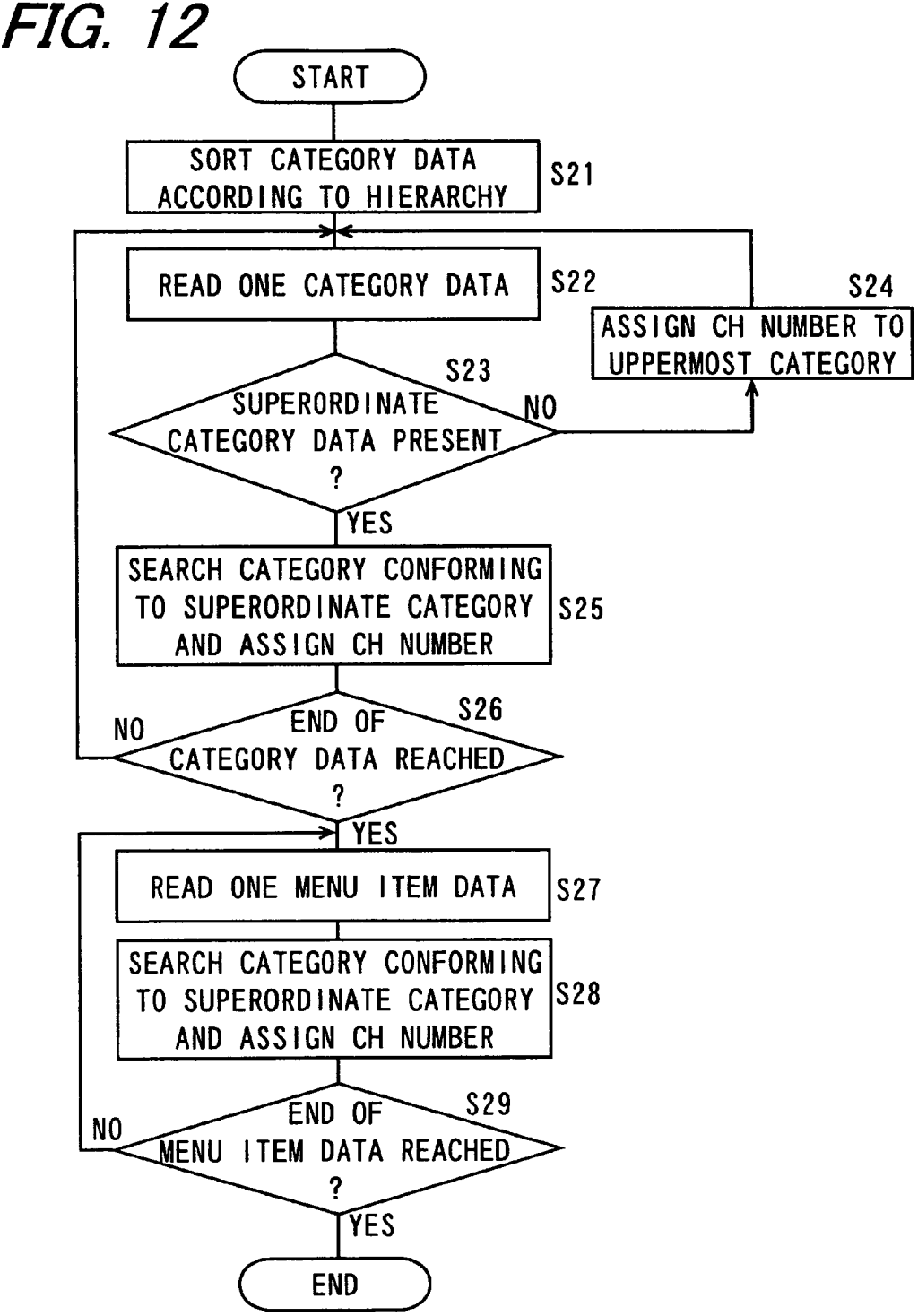
FIG. 12 is a flow chart showing a procedure to be followed by the receiving apparatus in producing a menu display format.

FIG. 12 is a flow chart showing a procedure to be followed by the receiving apparatus 1 in producing a menu display format. As has already been explained with reference to FIG. 6, in Steps 4 and 5, a menu display format is produced on the basis of the initial menu data, and thence the additional menu data is merged therewith. Each of the process steps can be achieved according to the flow chart shown in FIG. 12. A point of difference between Step 4 and Step 5 is that, in the former, the operation is started only with the initial menu data, whereas, in the latter, the operation is started in the presence of the already-compiled initial menu data.

In Step S21, according to the hierarchy 60 of each category data 56, the sorting of data is effected in ascending hierarchy number order, namely in descending hierarchal level order.

In Step S22, a piece of category data is read out from above. Next, in Step S23, the presence or absence of superordinate category data is checked on the basis of the superordinate category name 61. When it is found that the field for superordinate category name 61 is left in blank, or that the field for hierarchy 60 indicates 1, then the procedure proceeds to Step S24 where the category data is stored as the uppermost category data assigned with a predetermined ch number. Otherwise, the procedure proceeds to Step S25 where a search is run for a category that coincides with the superordinate category name 61 across all of the already-processed category data, and the ch number 59 is brought into correspondence with a channel number assigned to the category data 56 of the coincident category. In Step S26, whether or not the end of category data (the lowermost category data) has been reached is checked, and, if so, the procedure proceeds to Step S27 where the menu item data processing begins, but, if not, the procedure returns to Step S22 where the next category data is read out.

In Step S27, a piece of menu item data 65 is read out. In Step S28, a search is run for a category that coincides with the ID provided in the initial ID list 62 of the category data 56, and the ch number 68 is brought into correspondence with a channel number subordinate to the coincident category. In Step S29, whether or not the end of menu item data has been reached is checked, and, if so, the procedure comes to an end, but, if not, the procedure returns to Step S27 where the next menu item data is read out.

After that, the additional menu data is merged with the initial menu data. The merging of data can be accomplished by following the procedure described in the flow chart of FIG. 12 once again.

Figure 13A:
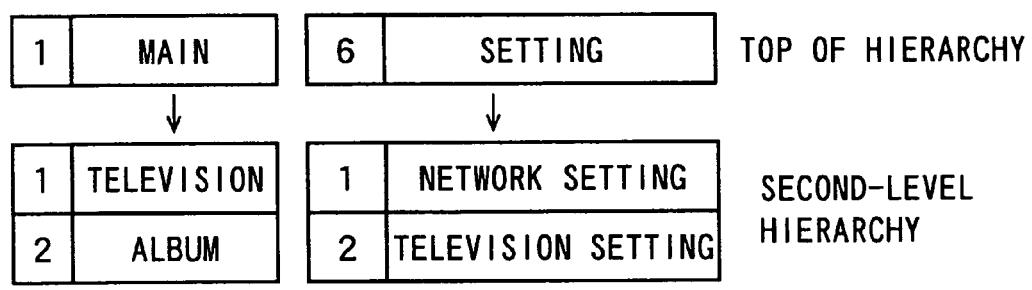
FIGS. 13A and 13B are views of menu data organized in a display format.
Figure 13B:
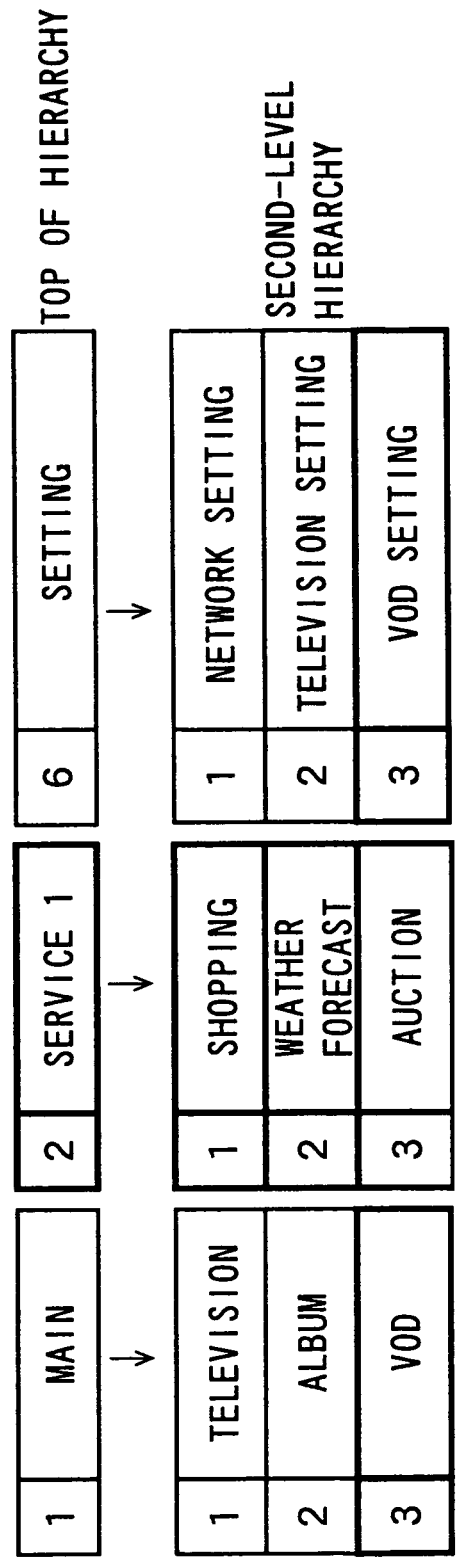

FIGS. 13A and 13B are views of the menu data organized in a display format, with FIG. 13A showing the initial menu data and FIG. 13B showing the menu display data obtained by merging the additional menu data with the initial menu data.

As shown in FIG. 13A, in the initial menu data, at the top of the hierarchy (the uppermost hierarchy) are [MAIN] category and [SETTING] category that correspond to channel numbers [1] and [6], respectively. At the second-level hierarchy, below the [MAIN] category are positioned [TELEVISION] category and [ALBUM] category that correspond to channel numbers [1] and [2], respectively. Likewise, below the [SETTING] category are positioned [NETWORK SETTING] category and [TELEVISION SETTING] category that correspond to channel numbers [1] and [2], respectively.

On the other hand, in FIG. 13B, the additional menu data is merged with the initial menu data as shown in FIG. 13A. At the top of the hierarchy is additionally positioned [SERVICE 1] category which corresponds to a channel number [2]. At the second-level hierarchy, below the [MAIN] category is additionally positioned [VOD (Video on Demand)] category which corresponds to a channel number [3]. Moreover, below the [SERVICE 1] category are positioned [SHOPPING] menu item, [WEATHER FORECAST] menu item, and [AUCTION] menu item that correspond to channel numbers [1], [2], and [3], respectively. Further, below the [SETTING] category is additionally positioned [VOD SETTING] category which corresponds to a channel number [3].

Although, in the present embodiment, the data elements are classified under two hierarchal levels, it is possible to increase the number of hierarchal levels. Moreover, at the time when a category or a menu item is assigned with a predetermined channel number, if the ch number of the received menu data conforms to the registered channel number, the existing number is overwritten.

Figure 14A:
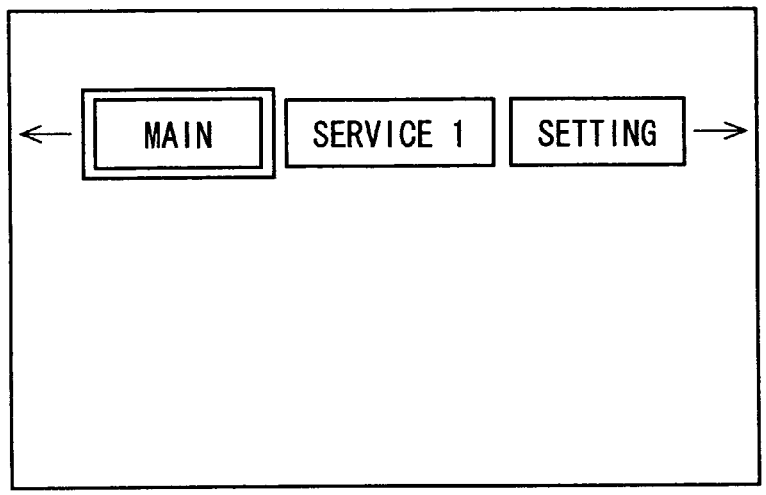
FIGS. 14A through 14C are views showing one example of menu screens to be displayed on a display section of a display device.
Figure 14B:
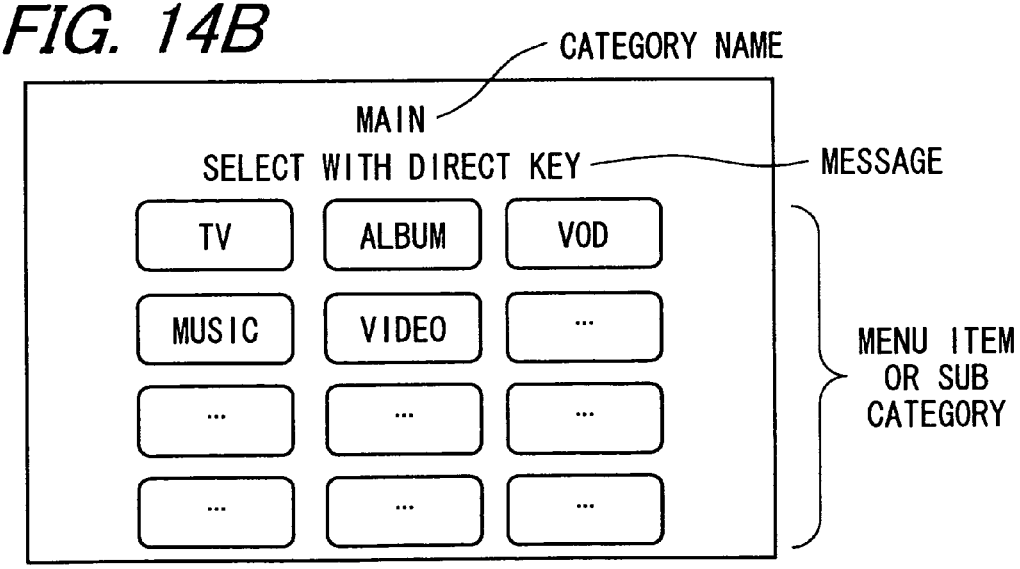
Figure 14C:
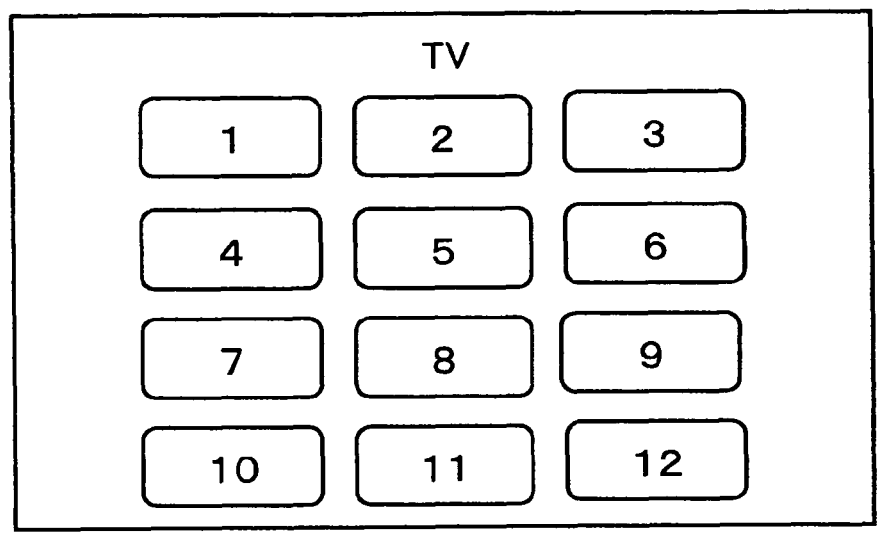

FIGS. 14A through 14C are views showing one example of menu screens to be displayed on the display section of the display device 6. As shown in FIG. 14A, displayed immediately after turning on the power are the categories standing at the top of the hierarchy, namely the uppermost categories. In a case where a URL address is described in the field for icon URL 63 (the field for icon URL 69) of the category data 56 (the menu item data 65), icon data acquisition is carried out at the time of displaying the menu screen. In order to achieve category selection, the right-hand or left-hand key portion of the service scrolling key 24 is operated to effect focusing on a target uppermost category. The entry of the selected category is confirmed by depressing the ENTER key 27. In FIG. 14A is illustrated a case where [MAIN] category is selected.

Upon the confirmation of the uppermost category to be displayed, as shown in FIG. 14B, the designation thereof based on the category name 58 of the category data 56 shows up on the screen. Immediately below the category designation is shown a character string described in the field for message 64. In addition, descendant categories of the selected category, namely the second-level categories, or menu items show up on the screen. The second-level categories as well as the menu items are each assigned with a predetermined channel number. Therefore, when viewed on the screen, the names of the second-level categories as well as the labels of menu items are so arranged that their channel numbers conform to the corresponding numbers of the key portions of the direct key 26 in the remote controller 18. In this way, a target second-level category or menu item can be selected by depressing a corresponding key portion of the direct key 26 of the remote controller 18. In FIG. 14B is illustrated a case where [TV] category is selected.

Upon the confirmation of the second-level category to be displayed, as shown in FIG. 14C, the designation thereof based on the category name 58 of the category data 56 shows up on the screen. In addition, descendant categories of the selected category, namely the third-level categories, or menu items show up on the screen. The third-level categories as well as the menu items are each assigned with a predetermined channel number. Therefore, when viewed on the screen, the names of the third-level categories as well as the labels of menu items are so arranged that their channel numbers conform to the corresponding numbers of the key portions of the direct key 26 in the remote controller 18. Upon depression of a given key portion of the direct key 26, connection to the URL described in the field for jump destination URL 70 is established. In a case where the field for jump destination URL 70 indicates the path stored in the receiving apparatus 1, the data processing program is executed.

In a case of selecting [TV] category as shown in the figure, the numbers of television broadcast channels show up on the screen in accordance with the key arrangement of the direct key 26. At this time, upon depression of a given key portion of the direct key 26, the data processing program is executed so that a television broadcast program corresponding to the selected key (channel) comes on the air.

In a case where the number of categories that are classified as the uppermost categories is small, a television broadcast program can be displayed without producing the screen display of the uppermost categories as shown in FIG. 14A. In this case, pre-adjustment needs to be carried out in a manner such that, for example, [MAIN] category is selected by depressing the key portion "A" of the general-purpose key 28, [SERVICE 1] category is selected by depressing the key portion "B" thereof, and [SETTING] category is selected by depressing the key portion "C" thereof.

Next, a description will be given below as to another embodiment of the invention. A receiving apparatus 1 and a service server 2 of this embodiment are identical in configuration with those shown in FIGS. 2 and 5, respectively, and thus the explanation whereof will be omitted.

According to the preceding embodiment, the receiving apparatus 1 executes a menu updating process every time the power is turned on. By way of contrast, in this embodiment, the receiving apparatus 1 checks the presence or absence of an update to the additional menu data stored in the service server at regular time intervals. This enables the updated menu data to take effect as swiftly as possible. When updating is confirmed, an additional menu data transmission request is issued.

Figure 15:
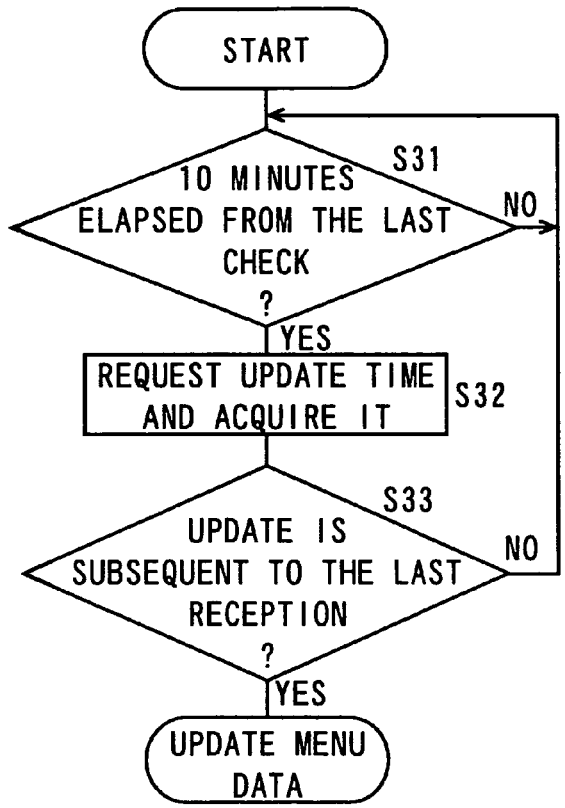
FIG. 15 is a flow chart showing a procedure to be followed by the receiving apparatus in carrying out an update confirmation process.
Figure 16:
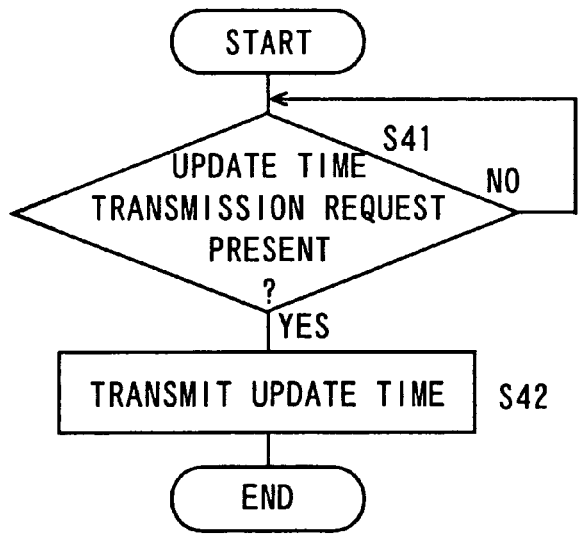
FIG. 16 is a flow chart showing a procedure to be followed by a service server in carrying out an update time transmission process.

FIG. 15 is a flow chart showing a procedure to be followed by the receiving apparatus 1 in carrying out an update confirmation process. FIG. 16 is a flow chart showing a procedure to be followed by the service server 2 in carrying out an update time transmission process. In this embodiment, a check is made once every 10 minutes.

Upon turning the power on, a menu updating process is performed, and the time of update is stored as a reception time in the menu storage portion 11a. In Step S31, whether or not 10 minutes have elapsed from the time of the last check or the time of the last additional menu data reception is checked. When a lapse of 10 minutes is not confirmed, then a standby mode is established. When a lapse of 10 minutes is confirmed, the procedure proceeds to Step S32 where an update time transmission request is issued to the service server 2 for transmitting additional menu data, and update-time information sent from the service server 2 is received as a response. At this time, the time at which the time of update was checked is stored as the time of the last check in the menu storage portion 11a. The update-time information is indicative of the time at which a change was made to additional menu data in the service server 2.

In the service server 2, as shown in FIG. 16, in Step S41, the presence or absence of an update time transmission request from the receiving apparatus 1 is monitored. When a request is confirmed, the procedure proceeds to Step S42 where update-time information is transmitted to the receiving apparatus 1 that issued the request. Even after the transmission of the requested update-time information has been completed, such an update time transmission process will be performed repeatedly in preparation to the next update time data transmission request.

Subsequently, in the receiving apparatus 1, in Step S33, a comparison is made between the received update-time information and the time of the last check or the time of the last additional menu data reception. When it is found that the update was made previous to the time of the last check or the time of the last additional menu data reception, then the procedure returns to Step S31. When it is found that the update was made subsequent to the time of the last check or the time of the last additional menu data reception, then the menu updating process as shown in FIG. 6 is performed to effect updating of the menu data.

In a case where connections to a plurality of service servers are carried out, the update confirmation process as shown in FIG. 15 is performed on each of the service servers on an individual basis. When an update to the additional menu data is confirmed in the course of the process, even if the update is associated only with one of the service servers, the additional menu data is received from alll of the service servers and menu display data is outputted.

Next, a description will be given below as to still another embodiment of the invention. A receiving apparatus 1 and a service server 2 of this embodiment are identical in configuration with those shown in FIGS. 2 and 5, respectively, and thus the explanation whereof will be omitted.

In general, the key arrangement of the remote controller 18 varies according to the type of the receiving apparatus 1. In the preceding embodiments, for example, the service server 2 identifies the type of the receiving apparatus 1 on the basis of the requests it receives from the receiving apparatus 1, and thereby recognizes the key arrangement of the remote controller 18.

There are some receiving apparatuses 1 which are constituted so as to be adaptable to a plurality of remote controllers 18 of different kinds, or to be connectable to service servers by means of a keyboard of a PC, for instance. In such a case, the service server 2 is notified of the key arrangement of the remote controller 18 used by a user.

Now, the key arrangement will be explained by way of three types: a 10 key-operated keyboard; a 12 key-operated remote controller; and a 15-key operated remote controller. The data elements of the initial menu data are compiled in accordance with the individual key arrangements.

Figure 17:
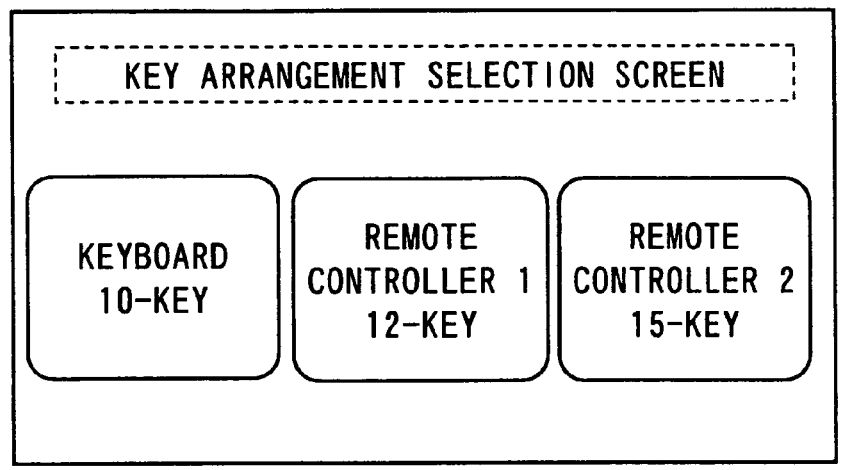
FIG. 17 is a view showing a key arrangement selection screen.

Subsequently to the display of the connection-destination selection screen in the course of the menu updating process, for example, a key arrangement selection screen 71 such as shown in FIG. 17 shows up on the display section of the display device 6 to allow a user to make a selection of a desired key arrangement. In accompaniment with the transmission of an additional menu data request, the service server 2 is notified of which key arrangement is selected from among 10-key arrangement, 12-key arrangement, and 15-key arrangement. Then, for example, in a case of notifying the service server 2 that the 15-key arrangement was selected, the additional menu data to be transmitted from the service server 2 includes category data and menu item data in which the numbers ranging from 12 through 15 are assigned to the field for ch number. In the process of composing a menu display format, the initial menu data corresponding to the selected key arrangement is used. That is, it is possible to create a menu screen in conformity with the number of keys, which is of great advantage.

Next, a description will be given below as to yet another embodiment of the invention. A receiving apparatus 1 and a service server 2 of this embodiment are identical in configuration with those shown in FIGS. 2 and 5, respectively, and thus the explanation whereof will be omitted.

In order to make communication service available, an appropriate troubleshooting method needs to be provided to cope with a failure occurring in a service server.

In a case where an external URL address is described in the field for jump destination URL of a menu item selected through the operation of the receiving apparatus 1, a target web site is normally viewed by launching a WWW browser. At this time, if the service server 2 does not send a response back and eventually a timeout occurs, there is a possibility that a change has been made to the jump destination URL. Accordingly, an additional menu data transmission request is issued.

Figure 18B:
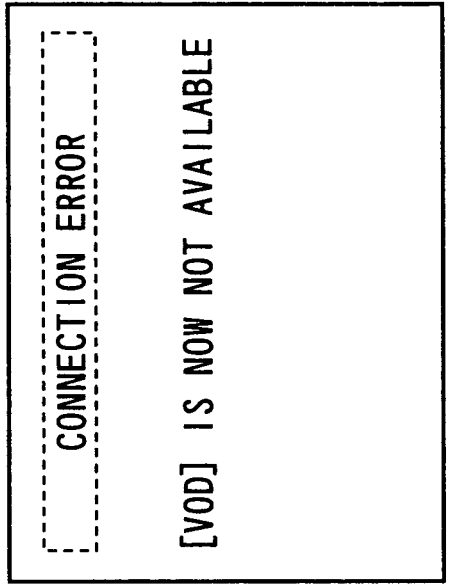
FIGS. 18A and 18B are views showing a warning screen displayed upon occurrence of troubles.
Figure 18A:
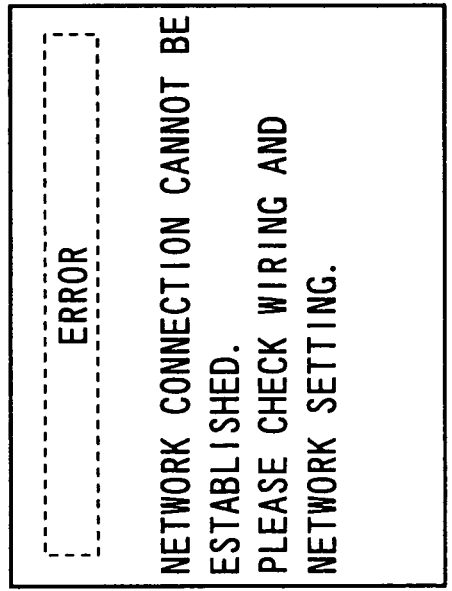

In the event of the request-issuing attempt ending in failure, it is judged that a network-setting trouble arises. Then, as shown in FIG. 18A, a warning screen shows up to urge a user to check the condition of network wiring or the setting for network connection.

By way of contrast, when the request is received successfully and desired additional menu data can be obtained accordingly, then it is checked whether or not the jump destination URL 70 of a menu item having an ID which is identical with the ID of the target menu item is different than it was before the data acquisition. When the jump destination URL 70 is found to remain the same, then it is judged that the server for providing the service suffers from a trouble. Correspondingly, a warning screen such as shown in FIG. 18B shows up to notify the user that the service is not available. When the jump destination URL 70 is found to go through some change, the menu data updating process as shown in FIG. 12 is executed.

Moreover, as shown in FIG. 19, every menu item data element included in each menu data may be provided with a trouble icon URL 71. Thereby, in a case where a specific service-related server shows a sign of trouble, as an icon to be displayed on the menu screen to indicate the trouble, the icon data of the trouble icon URL 71 is used. In contrast to the icon data of the icon URL 69, the icon data of the trouble icon URL 71 is so compiled as to provide a design appropriate for a clear visual understanding of unavailability of the service.

Further, in the display of category data with menu items as well as descendant categories on a menu screen, the contents of the jump destination URLs of all the menu items included in the category are read out in advance. In this case, when a sign of trouble is recognized as described above, the trouble icon is viewed on the screen before the user selects the menu item.

Upon confirmation of recovery from the trouble, the time of update stored in the service server 2 is forcibly set to be present time. In this way, every time the receiving apparatus 1 performs the update confirmation process as shown in FIG. 15, the menu data updating process is executed without fail. After it is judged that the server has recovered from the trouble, the icon status is shifted from the trouble icon to the normal icon corresponding to the icon URL 69.

Next, a description will be given below as to further another embodiment of the invention. A receiving apparatus 1 and a service server 2 of this embodiment are identical in configuration with those shown in FIGS. 2 and 5, respectively, and thus the explanation whereof will be omitted.

In this embodiment, the receiving apparatus 1 stores therein the history of user's menu screen operation and the information about the user. The operation history is transmitted to the service server 2.

In advance of additional menu data reception which is effected upon turning the power on at the outset of operation, in the receiving apparatus 1, a user registration screen such as shown in FIG. 20 is produced. The user registration screen shows up on the display section of the display device 6. In the user registration screen, the user enters his/her age, sex, and residential district by text selection to acquire a user ID. The user ID and user-selected items are stored in correlative relation in the initial setting data storage portion 12b of the receiving apparatus 1.

In the receiving apparatus 1, upon receipt of additional menu data, operation history data is compiled without making a distinction between the received additional menu data and the initial menu data. The operation history data is stored in the historic data storage portion 11c. FIG. 21 is a view showing the data architecture of the operation history data 72. The operation history data 72 is composed of a user ID 73, a service 74, an ID 75, a time 76, and an action 77. The user ID 73 refers to a user identifying number determined at the time of turning the power on. The service 74 refers to the identification designation of a service server in use. The ID 75 refers to the ID of a selected category or menu item. The time 76 refers to the time at which an action is effected. The action 77 refers to the kind of operation. To be more specific, in the field for action 77, a description of "VIEW" indicates merely the display of an icon, a description of "OPEN" indicates the starting of operation, and a description of "CLOSE" indicates the ending of operation. The operation history data 72 is stored as a sequential log of actions in the historic data storage portion 11c.

The operation history data 72 is transmitted to the service server 2 corresponding to the service in use during the interval when the receiving apparatus 1 is kept in an OFF state, or immediately before reception of additional menu data. In the former case, after the operation history data 72 is transmitted to the service server 2, initialization is effected. In the latter case, after the transmission of the operation history data 72, the service server 2 produces additional menu data in which the operation history data 72 is reflected. The additional menu data thus obtained is transmitted to the receiving apparatus 1. Upon the receipt of the additional menu data, the receiving apparatus 1 initializes the operation history data 72.

In the service server 2, all the actions related to the IDs of the individual categories or menu items are summarized on a user ID-by-user ID basis. With consideration given to user information, namely the age, sex, and residential district of each user, additional menu data corresponding to the ID of a user is selected from among candidate data elements, or suitable additional menu data is newly compiled. In this way, when the receiving apparatus 1 issues the next additional menu data transmission request, with a certain user ID specified, the service server 2 transmits additional menu data specific to the user to the receiving apparatus 1.

Figure 22:
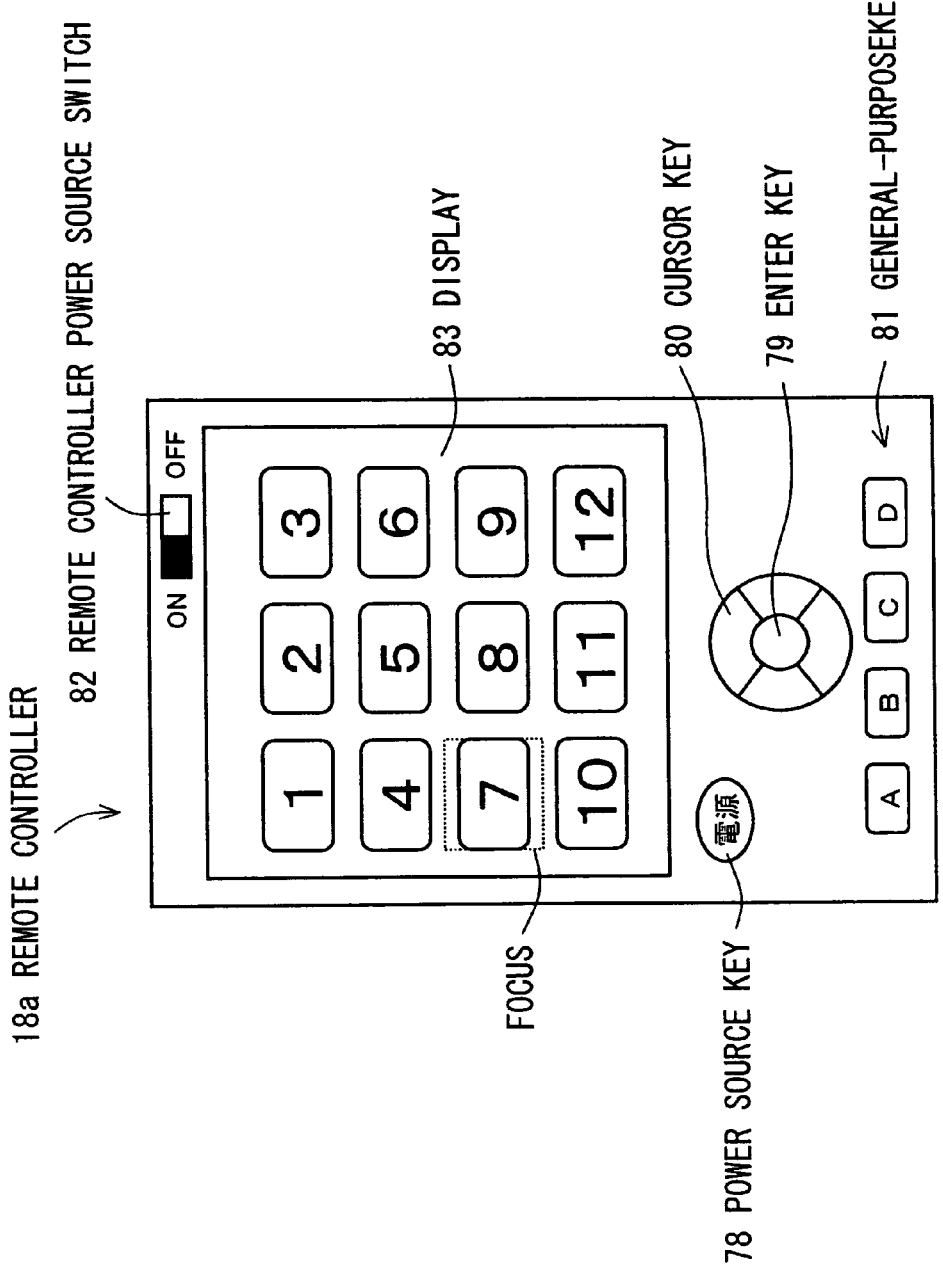
FIG. 22 is an external view of a remote controller.

In the embodiment, usable remote controllers include, other than the remote controller 18, a remote controller 18a shown in FIG. 22. The remote controller 18a is provided with user-operable keys and switches; that is, a power source key 78; an ENTER key 79; a cursor key 80; a general-purpose key 81; and a remote controller power source switch 82. Further, a display 83 is provided with a touch panel having substantially the same size of that of a display region, and detects in coordinates a point touched by a user's finger and devices such as a touch pen. On the basis of a layout of soft keys (corresponding to the direct key 26) displayed in the display region and the detected coordinates, the soft key selected by the user is detected.

The power source key 78 switches the receiving apparatus 1 main body between an ON state and an OFF state. The ENTER key 79 is used to effect input confirmation, depression of a key displayed on the menu screen, and other relevant operations. The cursor key 80 consists of four key portions indicating "upward-pointing symbol", "downward-pointing symbol", "leftward-pointing symbol", and "rightward-pointing symbol", for allowing cursor movement in upward and downward directions and rightward and leftward directions or focus movement in upward and downward directions and rightward and leftward directions on the screen of the display 83. The general-purpose key 81 consists of four key portions indicating "A", "B", "C", and "D", respectively, for allowing a direct selection of the top of the hierarchy of channels. The remote controller power source switch 82 switches the power source of the remoter controller 18a between an ON state and an OFF state by sliding a protrusion in a lateral direction. In an example of FIG. 22, the protrusion is positioned on a side indicated by "ON" to represent that the power source of the remote controller 18a is in the ON state. In the example of FIG. 22, on the display 83 are shown the soft keys corresponding to 12 channels ranging from 1 to 12, respectively, for allowing direct selection of channels in accordance with the numbers when touching the soft key with a user's finger or a touch pen. Note that only when the remoter controller power source switch 82 is in the ON state, displaying a screen of the display 83 and creating a signal of the remote controller in operation are carried out.

Figure 23:
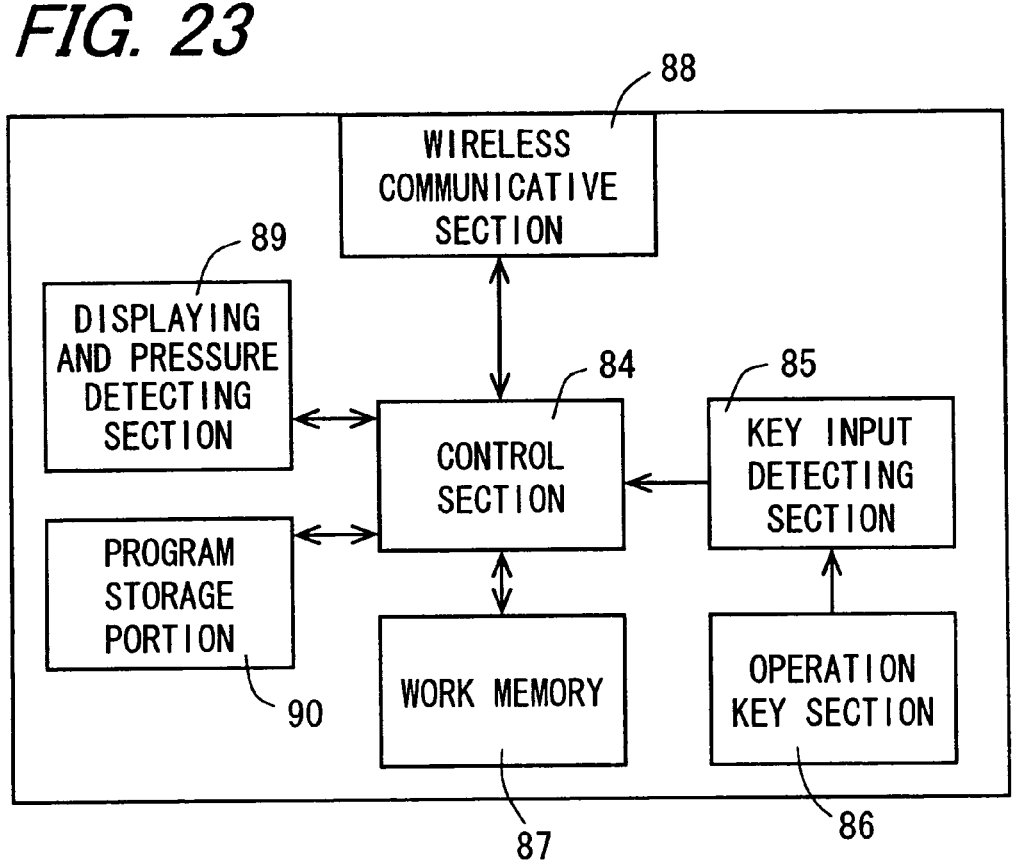
FIG. 23 is a block diagram showing a constitution of the remote controller.

FIG. 23 is a block diagram showing a constitution of the remote controller 18a. The remote controller 18a is composed of a control section 84, a key input detecting section 85, an operation key section 86, a work memory 87, a wireless communicative section 88, a displaying and pressure-detecting section 89, and a program storage portion 90. The control section 84 carries out overall processes and controls conducted at the remote controller 18a. The operation key section 86 includes the keys shown in FIG. 21. Upon the operation key section 86 being operated by a user, the key input detecting section 85 built as detecting means detects which key is selected, and the control section 84 outputs the detection result about the inputted key by way of the wireless communicative section 88 acting as data transmitting means. The wireless communicative section 88 is constituted so as to be connectable to a wireless LAN, for receiving the menu data sent from the communication section 14 of the receiving apparatus 1 via the broadband router 5 or for sending data about a type of key for operating the receiving apparatus 1. The displaying and pressure-detecting section 89 corresponds to the display 83 with the touch panel shown in FIG. 22, and is capable of displaying the menu data sent from the receiving apparatus 1, given character, graphic symbol, and the like. Through detection of a soft key touched by a user as described above, data about a type of inputted key for operating the receiving apparatus 1 is sent. The work memory 87, which is constituted by a volatile memory, is used for development of a program stored in the after-described program storage portion 90 and for temporary storage of the received menu data sent from the receiving apparatus 1. The program storage portion 90 is constituted by a volatile memory, for storing a program for displaying the menu and issuing the data about a type of key.

Figure 24:
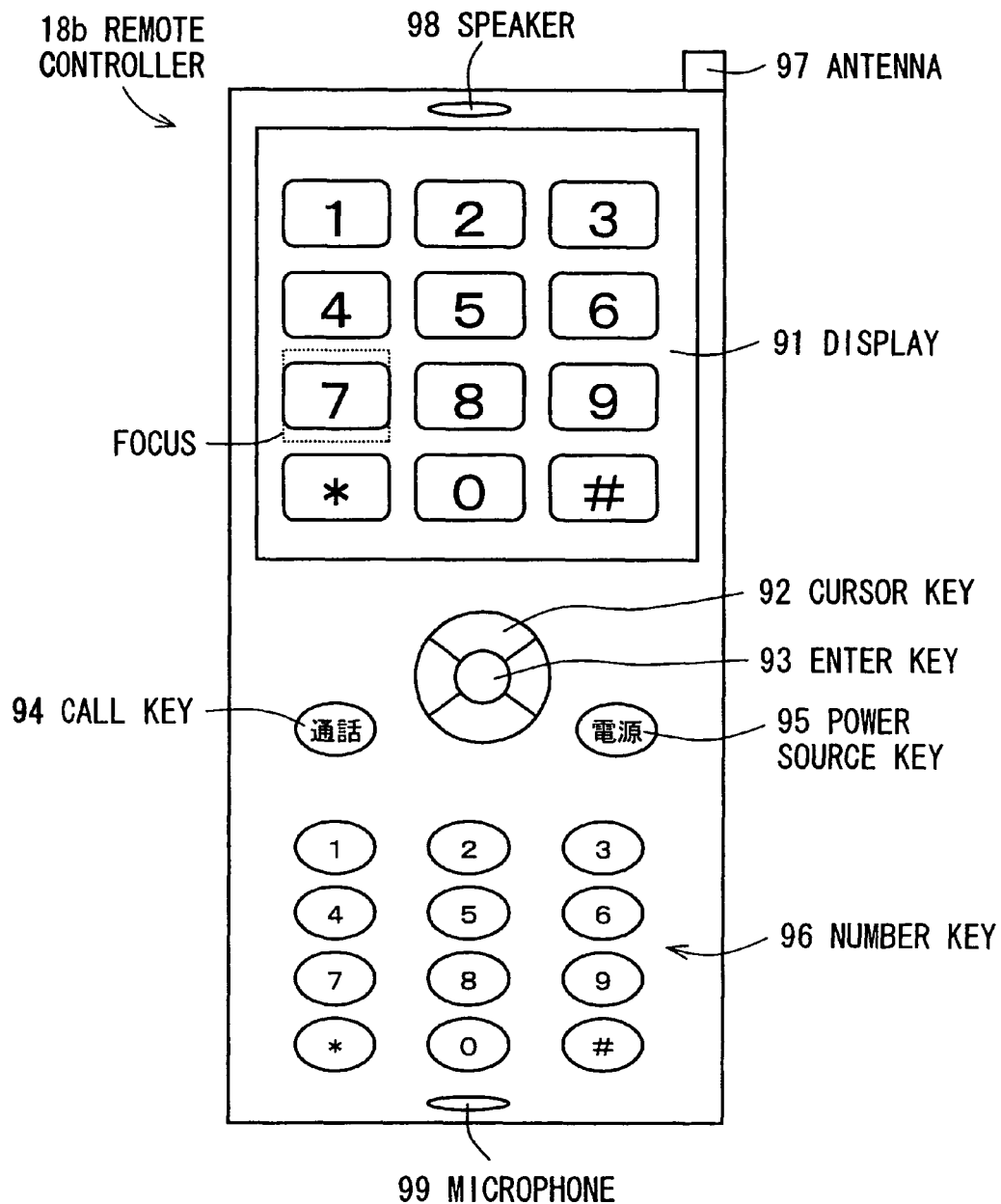
FIG. 24 is an external view of a remote controller.

In the embodiment, usable remote controllers include, other than the remote controller 18 and the remote controller 18a, a remote controller 18b shown in FIG. 24. The remote controller 18b is provided with a function to operate as a mobile phone, which comprises a display 91; an antenna 97; a speaker 98; a microphone 99 and in addition, user-operable keys; that is, a cursor key 92; an ENTER key 93; a call key 94; a power source key 95; and a number key 96. The display 91 which operates in the same way as that of the display 83 of the remote controller 18a, displays soft keys corresponding to 12 channels ranging from 1 to 12. The cursor key 92 consists of four key portions indicating "upward-pointing symbol", "downward-pointing symbol", "leftward-pointing symbol", and "rightward-pointing symbol", for allowing cursor movement in upward and downward directions and rightward and leftward directions or focus movement in upward and downward directions and rightward and leftward directions on the screen of the display 91. The ENTER key 93 is used to effect input confirmation, depression of a key displayed on the menu screen, and other relevant operations. After a phone number has been inputted by operation of the after described number key 96, the call key 94 is depressed to effect telephone communication with a phone machine on a called side through a mobile phone communication network (mobile communication network). The power source key 95 is depressed for a relatively longer period of time to allow switching of the power source of the remote controller 18b between an ON state and OFF state. The number key 96, which is composed of 12 pieces of key portions assigned with numbers ranging from 0 to 9 and symbols of "*" and "#", is used for selection of the menu and input of a phone number on calling. The antenna 97 is an antenna for connecting to the mobile phone communication network. The speaker 94 is used for output of received calling voice in communication. The microphone 99 is used for input of user's voice in communication.

Figure 25:
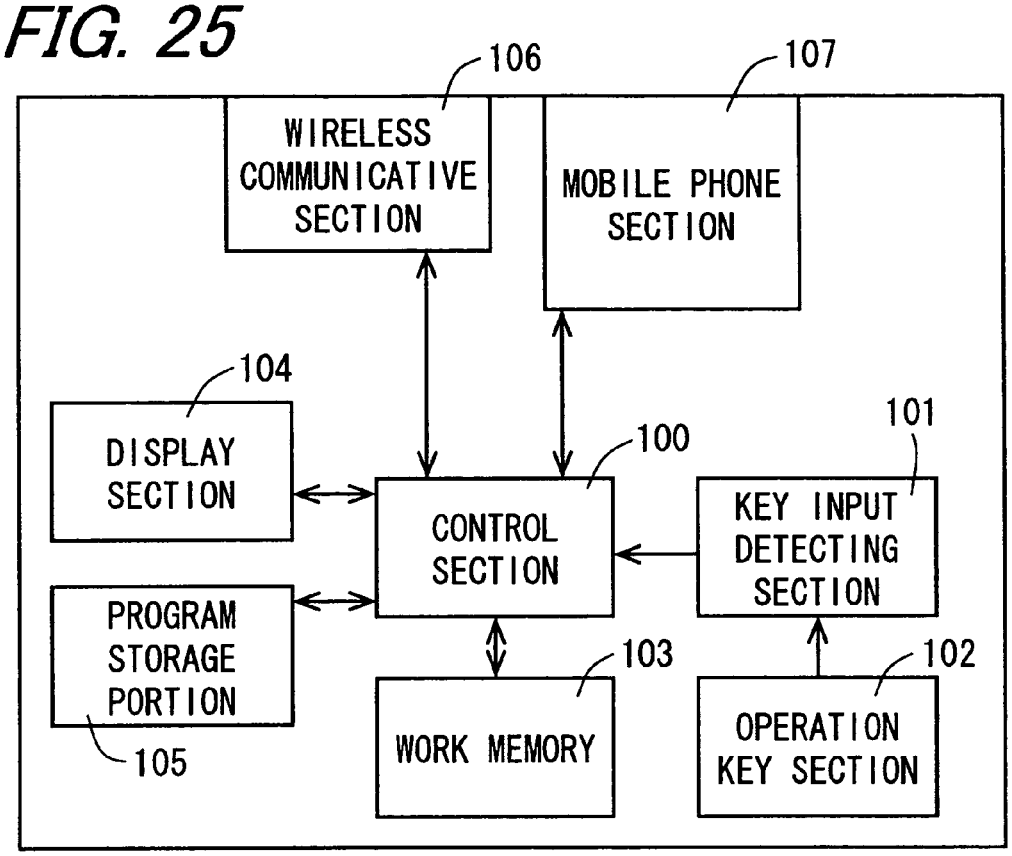
FIG. 25 is a block diagram showing a constitution of the remote controller.

FIG. 25 is a block diagram showing a constitution of the remote controller 18b. The remote controller 18b is composed of a control section 100, a key input detecting section 101, an operation key section 102, a work memory 103, a display section 104, a program storage portion 105, a wireless communicative section 106, and a mobile phone section 107. The control section 100 carries out overall processes and controls conducted at the remote controller 18b. The operation key section 102 includes the keys shown in FIG. 24. Upon the operation key section 102 being operated by a user, the key input detecting section 101 built as detecting means detects which key is selected. The control section 100 causes output of the detection result about the inputted key by way of the wireless communicative section 106 acting as data transmitting means. The wireless communicative section 106 is constituted so as to be connectable to a wireless LAN, for receiving the menu data sent from the communication section 14 of the receiving apparatus 1 via the broadband router 5 or for sending data about a type of key for operating the receiving apparatus 1. The mobile phone section 107 comprises the antenna 97, speaker 98, and microphone 99 shown in FIG. 24. The mobile phone section 107 has functions of effecting not only the telephone communication through the mobile phone communication network but also data communication through a connection with Internet by way of the mobile phone communication network. The mobile phone section also has functions of receiving various services and downloading a software which will be stored in the program storage portion 105. The display section 104 which corresponds to the display 91 shown in FIG. 24, displays the menu data sent from the receiving apparatus 1. The work memory 103, which is constituted by a volatile memory, is used for development of a program stored in the after-described program storage portion 105 and for temporary storage of the received menu data sent from the receiving apparatus 1. The program storage portion 105 is constituted by a volatile memory, for storing a program for displaying the menu and issuing the data about a type of key.

Figure 26A:
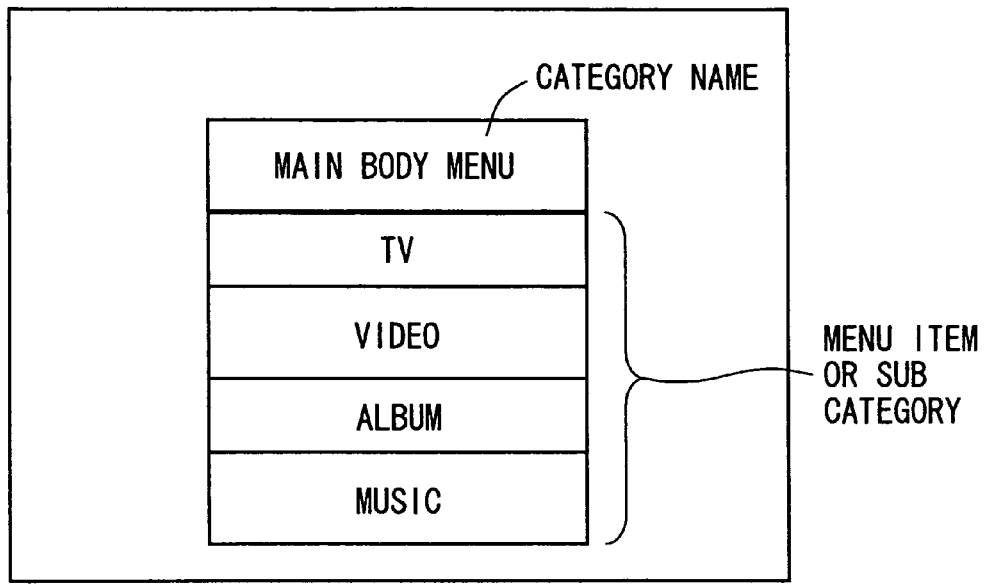
Figure 26B:
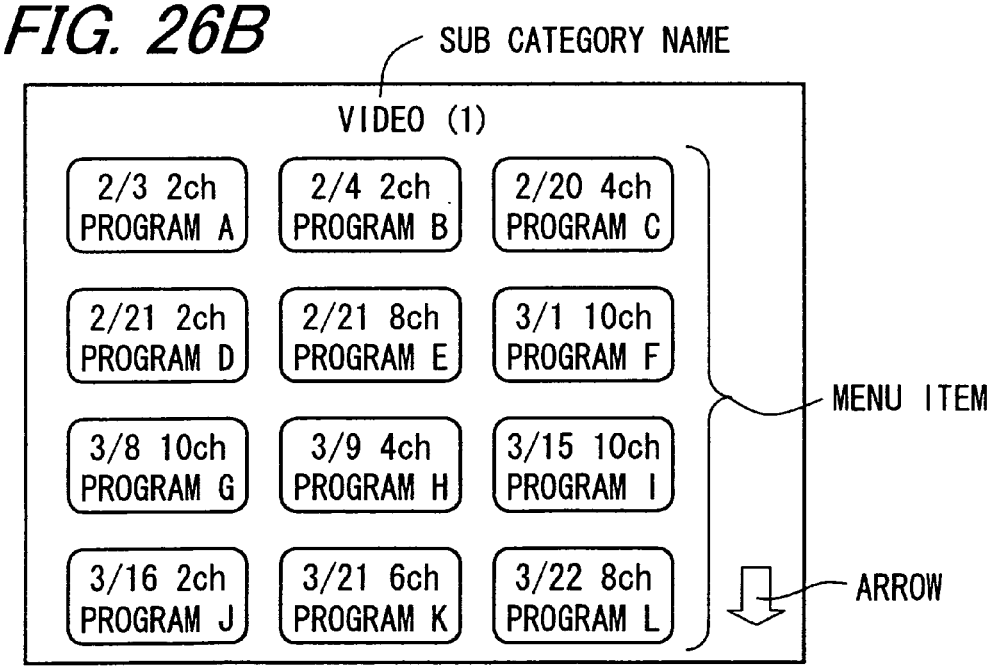

Further examples of the menu screen shown in the display device 6 may include menu screens as shown in FIGS. 26A to 26C. When one of four keys constituting the general-purpose key 81 is depressed, the receiving apparatus 1 sends from the communicative section 14 the menu data having the same data architecture as that on the menu screen shown in FIG. 26A, which is displayed on the display device 6. The remote controller 18a receives the menu data from the wireless communicative section 87 via the broadband router 5, and makes the work memory 87 store the menu data. A menu screen is then created by the control section 84, and displayed by the displaying and pressure detection section 89. Note that in FIG. 26A is illustrated an example of a case where "A" key is depressed among three key portions of the general-purpose key 81 in a main body menu corresponding to the second-level hierarchy. The menu screen is displayed on the basis of the category name 58 of the category data 56. On the menu screen are displayed in a list form a category at a third-level hierarchy which is positioned below the selected category, and menu items. Furthermore, in a case where a menu of video is selected by the displaying and pressure-detecting section 89, the menu screen shown in FIG. 26B for showing the menu belonging to the category of video is displayed on both of the display device 6 and the displaying and pressure-detecting section 89 of the remote controller 18a. In the example shown in FIG. 26B, the number of the menu items belonging to the category of video exceeds the displayable number on one screen. In this case, the remote controller 18a is used to point a down-arrow part shown in the displaying and pressure-detecting section 89, thereby to allow display, as shown in FIG. 26C, of the remaining menu items which are not displayed in FIG. 26B. In this case, the category data 56 to which these menus are subordinate, has the same architecture as that shown in FIG. 10 though the initial ID list 62 includes more number of IDs than displayable on one screen. The subordinate menu item data has the same architecture as that shown in FIG. 11. However, the subordinate menu item data has an ID included in the initial ID list of the superordinate category data, and the ch number 68 consists of a plurality of sets of menu items having numbers ranging from 1 to 12 and thus, the menu items are displayed on different screens for each set thereof in an order arranged in the list recorded in the menu item data. In this example, the menu item is included so as to be subordinate to the category data. This is the case also when the category data constituting a sub category is included.

Figure 27A:
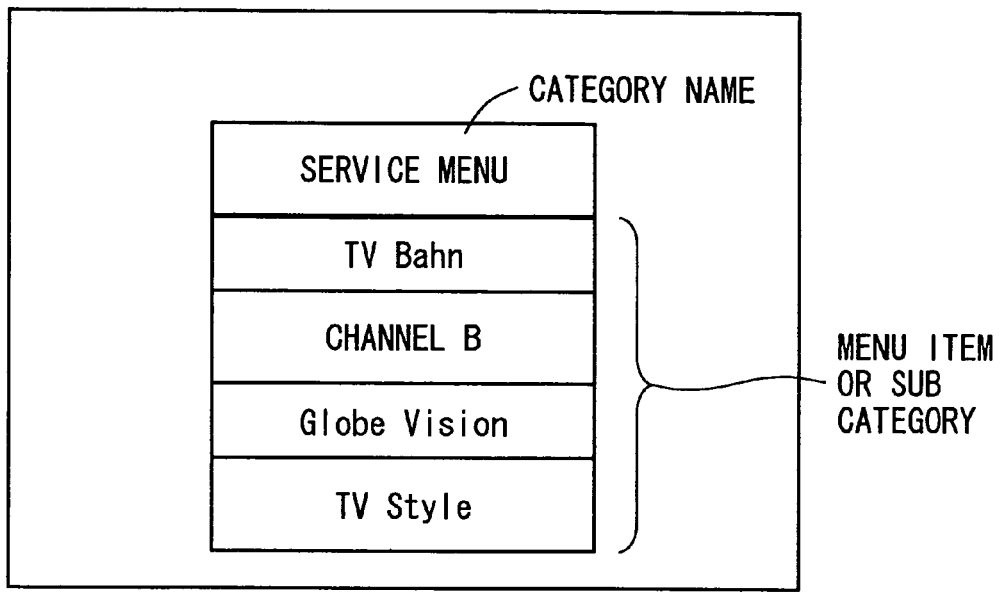
FIGS. 27A and 27B are views showing an alternate example of the menu screens to be displayed on the display section of the display device.
Figure 27B:
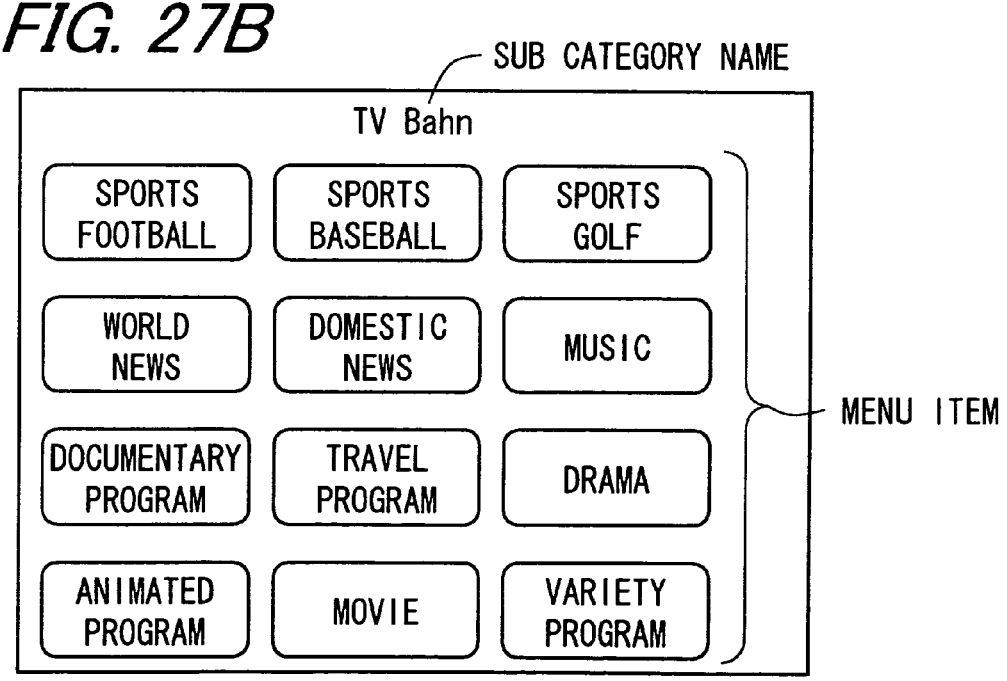

A service server is selected on the menu screen shown in FIG. 27A, which is shown on both of the display device 6 of the receiving apparatus 1 and the displaying and pressure-detecting section 89 of the remote controller 18a, by means of depression of "B" key of the general-purpose key 81 of the remote controller 18a. In a case of selecting one service; that is "TV Bahn" in FIG. 27A, for example, a menu screen shown in FIG. 27B is displayed on both of the display device 6 of the receiving apparatus 1 and the displaying and pressure-detecting section 89 of the remote controller 18a. On the menu screen, as menu items included in a TV Bahn category, a list of services provided by the TV Bahn service is displayed.

By employing the above configuration, it is not always necessary to provide the direct key on the remote controller because the same function can be achieved also by operating the soft key presented on the display of the remote controller. Further, the top of hierarchy in the menu can be also selected without selection in a menu form, but by direct selection through operation of the general-purpose key of the remote controller or other operations. Even when there exist excess number of the sub categories belonging to the category or menu items than displayable on one screen, the selecting operation can be conducted by proceeding to a next screen through operation of the remote controller. Further, in the selection of the service server, menus of all services are obtained at the time of acquisition of updating menus, whereby allowing omission of user's selecting operation at the time of acquisition of the updating menus.

Further, in the case of employing the remote controller 18b, when the ENTER key 93 is depressed, the receiving apparatus 1 sends from the communicative section 14 the menu data having the same architecture as that on the menu screen shown in FIG. 26A, which is displayed on the display device 6. The remote controller 18b receives the menu data from the wireless communicative section 87 via the broadband router 5, and stores the menu data in the work memory 87. A menu screen is then created by the control section 84, and displayed on the display 91. Regarding subsequent operations, the focus is transferred to the to-be-selected menu item by means of the cursor key 92 and the ENTER key 92 is then depressed, whereby allowing transmission of data about a type of inputted key to the receiving apparatus 1. In addition, by operating each of the number keys 96 as the direct keys, it is possible to transmit to the receiving apparatus 1 data about a type of inputted key in accordance with each of the menu screens of FIG. 26B, FIG. 26C, and FIG. 27B.

The above configuration makes it possible to operate the mobile phone as the remote controller of the receiving apparatus 1.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. A communication system comprising:
   a data terminal apparatus configured to execute a plurality of functions in a selective manner by using a menu screen; and
   a server apparatus constituted so as to effect data communication with the data terminal apparatus,
   wherein the data terminal apparatus comprises:
   a tuner operable to receive a broadcast signal;
   a terminal-side storage device storing therein first menu data which indicates a layout of the menu screen and permits selection of initial functions, wherein the first menu data comprises data for controlling a display device to display the broadcast signal received by the tuner;
   a data producing unit for obtaining third menu data on the basis of the first menu data and second menu data which is different from the first menu data;
   a screen producing unit for creating a first menu screen on the basis of the first menu data, the first menu screen having a hierarchical organization;
   an output device for outputting the menu screen thus created; and
   a terminal-side communication device for effecting data communication with the server apparatus,
   wherein the server apparatus comprises:
   a server-side storage device generating and storing therein the second menu data, the server-side storage apparatus generating the second menu data according to which initial function of the first menu data has been selected by the terminal-side storage device and transmitted to the server apparatus; and
   a server-side communication device for effecting data communication with the data terminal apparatus,
   and wherein when the server-side communication device transmits the second menu data to the data terminal apparatus and the terminal-side communication device of the data terminal apparatus receives the second menu data sent from the server apparatus,
   the data producing unit obtains, on the basis of the first menu data and the second menu data, third menu data having the same data architecture as the first menu data and
   wherein the first menu data refers to unrewritable initial menu data, and, every time the second menu data is received, the data producing unit produces the third menu data by adding the received second menu data to the first menu data, the screen producing unit creates a second menu screen on the basis of the third menu data thus obtained such that the second menu screen is a supplementary version of the first menu screen having the same hierarchical organization and information as the first menu screen supplemented with the third menu data and being displayed in a hierarchical organization that matches and supplements multiple levels of the hierarchical organization of the first menu screen, wherein the communication system further comprises a selection device for permitting selection of a function to be executed, the selection device comprising:

a plurality of keys;

a detector for detecting which key is selected from among the plurality of keys; and a transmitter for transmitting a detection result to the data terminal apparatus, wherein the data terminal apparatus includes a receiver for receiving the detection result sent from the selection device, wherein the screen producing unit creates a menu screen in accordance with a key arrangement of the selection device, and wherein the second menu data is composed of menu item data and category data, the menu item data permitting selection of menu items for invoking execution of functions corresponding thereto, and the category data including information indicative of correspondence between the menu items and the plurality of keys of the selection device, wherein the information indicative of correspondence between the menu items and the plurality of keys of the selection device includes a category name, a ch number, a hierarchy indicating a hierarchical level of each of the menu items, and a superordinate category data indicating a designation of superordinate category to which each of the menu items belongs, wherein, in a case where a menu item has the hierarchy which is 1 or the superordinate category data which is blank, the data terminal apparatus assigns the menu item to an uppermost category and assigns with the menu item a predetermined ch number, and otherwise, the data terminal apparatus searches an upper-level category conforming to the menu item, and assigns the menu item with a ch number that coincides with a ch number of the upper-level category.

2. The communication system of claim 1, wherein each of the menu data is arranged in a hierarchical format, and the screen producing unit creates a hierarchical set of menu screens.

3. The communication system of claim 1, further comprising a mobile terminal apparatus for permitting selection of a function to be executed, the mobile terminal apparatus comprising:

a plurality of keys;

a detector detecting which key is selected from among the plurality of keys; and a displaying and detecting unit for displaying a plurality of soft keys and detecting which soft key is selected from among the plurality of soft keys;

a transmitting and receiving unit for transmitting a detection result to the data terminal apparatus and receiving any of the first to third menu data sent from the data terminal apparatus; and a terminal-side screen producing unit for creating a menu screen on the basis of any of the received first to third menu data, wherein the displaying and detecting unit displays a soft key by which a function can be selected on the menu screen created by the terminal-side screen producing unit, and upon the selection of the soft key, transmits data about a type of the function corresponding to the selected soft key to the data terminal apparatus via the transmitting and receiving unit.

4. A data terminal apparatus constituting the communication system of claim 1, comprising:

a requesting unit for issuing a request for transmission of the second menu data to the server apparatus.

5. A server apparatus constituting the communication system of claim 1, comprising:

a determining unit for determining which second menu data is transmitted to the data terminal apparatus on the basis of historic data indicative of a history of function execution effected by the data terminal apparatus.

6. A mobile terminal apparatus constituting the communication system of claim 3, comprising:

a menu data requesting unit for issuing a request for transmission of any of the first to third menu data to the data terminal apparatus.

7. A menu screen updating method of updating a menu screen on the basis of information sent from a server apparatus in a communication system composed of a data terminal apparatus configured to execute a plurality of functions in a selective manner by using a menu screen and the server apparatus constituted so as to effect data communication with the data terminal apparatus, the method comprising the steps of:

outputting a first menu screen on the basis of first menu data, the first menu screen having a hierarchical organization and permitting selection of initial functions;

transmitting by the server apparatus to the data terminal apparatus, second menu data which is different from the first menu data indicative of a layout of the menu screen that is stored in the data terminal apparatus the second menu data being produced by the server apparatus according to which initial function of the first menu data has been selected by the data terminal apparatus transmitted to the server apparatus;

upon receipt of the second menu data sent from the server apparatus by the data terminal apparatus, producing on the basis of the first menu data and the second menu data, third menu data having the same data architecture as the first menu data wherein the first menu data refers to unrewritable initial menu data, and, every time the second menu data is received, producing the third menu data by adding the received second menu data to the first menu data; and outputting a second menu screen on the basis of the third menu data thus obtained such that the second menu screen is a supplementary version of the first menu screen having the same hierarchical organization and information as the first menu screen supplemented with the third menu data and being displayed in a hierarchical organization that matches and supplements multiple levels of the hierarchical organization of the first menu screen, wherein the data terminal apparatus comprises a tuner operable to receive a broadcast signal, wherein the first menu data comprises data for controlling a display device to display the broadcast signal received by the tuner, wherein the communication system further comprises a selection device for permitting selection of a function to be executed, the selection device comprising:

a plurality of keys;

a detector for detecting which key is selected from among the plurality of keys; and a transmitter for transmitting a detection result to the data terminal apparatus, wherein the data terminal apparatus includes a receiver for receiving the detection result sent from the selection device, wherein a menu screen is created in accordance with a key arrangement of the selection device, and wherein the second menu data is composed of menu item data and category data, the menu item data permitting selection of menu items for invoking execution of functions corresponding thereto, and the category data including information indicative of correspondence between the menu items and the plurality of keys of the selection device, wherein the information indicative of correspondence between the menu items and the plurality of keys of the selection device includes a category name, a ch number, a hierarchy indicating a hierarchical level of each of the menu items, and a superordinate category data indicating a designation of superordinate category to which each of the menu items belongs, wherein, in a case where a menu item has the hierarchy which is 1 or the superordinate category data which is blank, the data terminal apparatus assigns the menu item to an uppermost category and assigns with the menu item a predetermined ch number, and otherwise, the data terminal apparatus searches an upper-level category conforming to the menu item, and assigns the menu item with a ch number that coincides with a ch number of the upper-level category.

* * * * *